(12) United States Patent
Miura

(10) Patent No.: US 8,006,582 B2
(45) Date of Patent: Aug. 30, 2011

(54) GEAR, AND IMAGE FORMING APPARATUS PROVIDED WITH THE SAME

(75) Inventor: Manabu Miura, Osaka (JP)

(73) Assignee: Kyocera Mita Corporation (JP)

( * ) Notice: Subject to any disclaimer, the term of this patent is extended or adjusted under 35 U.S.C. 154(b) by 733 days.

(21) Appl. No.: 12/112,482

(22) Filed: Apr. 30, 2008

(65) Prior Publication Data

US 2008/0276741 A1 Nov. 13, 2008

(30) Foreign Application Priority Data

May 11, 2007 (JP) .................................. 2007-126886

(51) Int. Cl.
*F16H 55/17* (2006.01)

(52) U.S. Cl. ..................................... 74/434; 74/DIG. 10

(58) Field of Classification Search ..................... 74/434, 74/457, 459.5, 460, 461, DIG. 10, 443, 446
See application file for complete search history.

(56) References Cited

U.S. PATENT DOCUMENTS 6,752,035 B2 * 6/2004 Noguchi et al. ................ 74/461

FOREIGN PATENT DOCUMENTS

| JP | 11-13861 | | 1/1999 |
|---|---|---|---|
| JP | 11013861 A | * | 1/1999 |
| JP | 2000110919 A | * | 4/2000 |
| JP | 2004230687 A | * | 8/2004 |
| JP | 3666978 | | 6/2005 |

* cited by examiner

*Primary Examiner* — Thomas R Hannon
*Assistant Examiner* — Phillip A Johnson
(74) *Attorney, Agent, or Firm* — Gerald E. Hespos; Michael J. Porco

(57) ABSTRACT

A gear is made of resin and includes: a support cylindrical portion; a teeth-formed cylindrical portion arranged coaxially with the support cylindrical portion on a radially outer side of the support cylindrical portion and formed with a plurality of teeth in its outer periphery; and a web connecting an outer peripheral surface of the support cylindrical portion and an inner circumferential surface of the teeth-formed cylindrical portion, and an axial thickness of at least a part of the web becomes thinner gradually from the outer peripheral surface of the support cylindrical portion to the inner circumferential surface of the teeth-formed cylindrical portion.

27 Claims, 16 Drawing Sheets

GEAR, AND IMAGE FORMING APPARATUS PROVIDED WITH THE SAME

BACKGROUND OF THE INVENTION

1. Field of the Invention

The present invention relates to a gear, and image forming apparatuses such as an electrostatic copying machine, a printer, a facsimile machine, and the like provided with the gear.

2. Description of the Related Art

Japanese Patent No. 3666978 discloses a gear including: an outer peripheral portion having a cylindrical shape and provided with teeth; a rotation support portion having a cylindrical shape; an annular rib provided between the outer peripheral portion and the rotation support portion; an arm connecting the rotation support portion and the annular rib; an arm connecting the annular rib and the outer peripheral portion; first radial ribs connecting the rotation support portion and the annular rib; and second radial ribs connecting the annular rib and the outer peripheral portion. The arm connecting the rotation support portion and the annular rib is named as "first arm", and the arm connecting the annular rib and the outer peripheral portion is named as "second arm".

In the gear disclosed in Japanese Patent No. 3666978, each of the first and second arms is so formed as to have a plate-like shape which is perpendicular to a center of the gear, and a thickness in an axial direction of each arm is constant. However, an axial thickness of the second arm is thinner than an axial thickness of the first arm. Further, a circumferential thickness of each of the first and second radial ribs is constant. However, a circumferential thickness of the each second radial rib is thinner than a circumferential thickness of each first radial rib.

In such configuration, when a radial distance between the annular rib and the cylindrical outer peripheral portion is short, radial lengths of the second arm and the radial ribs become short. Accordingly, it is possible to improve a strength of the gear while maintaining a teeth surface accuracy i.e. a gear accuracy. However, when the radial distance between the annular rib and the cylindrical outer peripheral portion is long, radial lengths of the second arm and the second radial ribs become long. Accordingly, it is likely that a support strength of the teeth, which is strength of a gear in extended meaning, may be lacked. Further, in this case, repletion of synthetic resin to a forming die at a time of performing an injection molding to form the gear with synthetic resin may become worse, so that a defective molding may occur and a yield rate may be lowered. Further, in an image forming apparatus using such gear lacking strength for driving a rotating member, vibrations due to the defect in meshing of gears and unevenness in rotation may occur, so that an image quality may be impaired. Such problem may occur in a gear having neither an annular rib nor a radial rib.

SUMMARY OF THE INVENTION

An object of the present invention is to provide a new gear having a high yield rate while maintaining a required teeth surface accuracy and strength, and an image forming apparatus provided with the gear.

A gear in accordance with one aspect of the present invention includes a gear made of resin and including: a support cylindrical portion; a teeth-formed cylindrical portion arranged coaxially with the support cylindrical portion on a radially outer side of the support cylindrical portion and formed with a plurality of teeth in its outer periphery; and a web connecting an outer peripheral surface of the support cylindrical portion and an inner circumferential surface of the teeth-formed cylindrical portion. An axial thickness of at least a part of the web becomes thinner gradually from the outer peripheral surface of the support cylindrical portion to the inner circumferential surface of the teeth-formed cylindrical portion.

These and other objects, features and advantages of the present invention will become more apparent upon reading of the following detailed description along with the accompanied drawings.

DETAILED DESCRIPTION OF THE PREFERRED EMBODIMENTS

Hereinafter, an embodiment of a gear which is configured in accordance with the present invention and an embodiment of an image forming apparatus provided with the gear will be described in detail with reference to the attached drawings.

Figure 1:
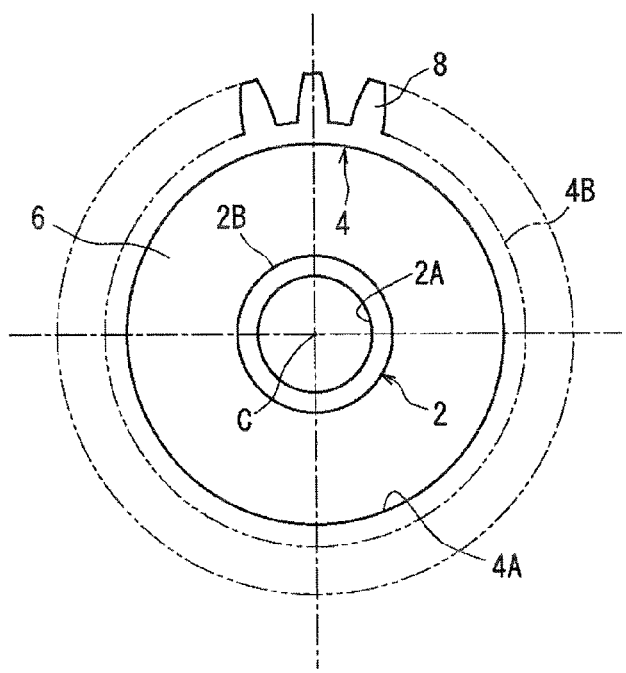
FIG. 1 is a front view schematically showing an embodiment of a gear which is configured in accordance with the present invention.
Figure 2:
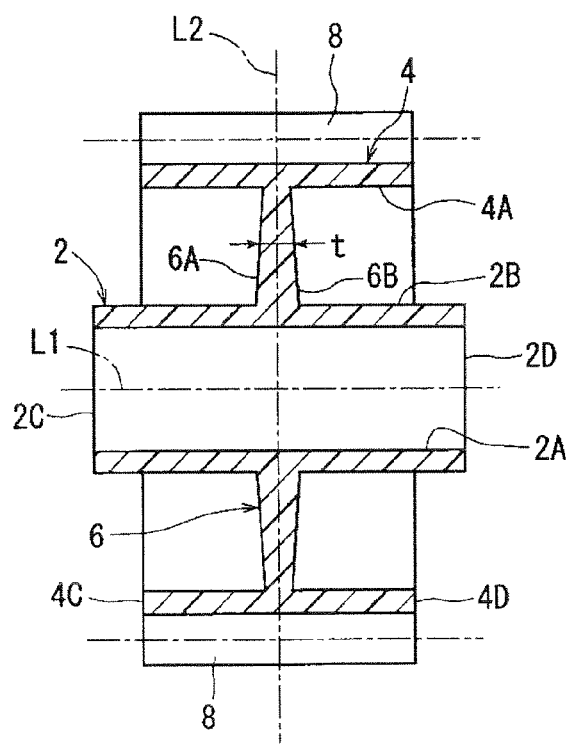
FIG. 2 is a vertical sectional view of the gear shown in FIG. 1.

Referring to FIGS. 1 and 2, the gear in accordance with the present embodiment may be integrally formed by an injection molding with any synthetic resin and is provided with a support cylindrical portion 2, a teeth-formed cylindrical portion 4, and a web 6.

The support cylindrical portion 2 has a cylindrical shape and is so formed that a radial thickness is constant along a circumferential direction. The support cylindrical portion 2 includes a support hole 2A having an inner circumferential surface, an outer peripheral surface 2B coaxial with the support hole 2A, one axial end surface 2C in an axial direction, and the other axial end surface 2D. The one axial end surface 2C and the other axial end surface 2D are perpendicular to an axis line L1 of the support hole 2A. The support cylindrical portion 2 extends in a straight line between the one axial end surface 2C and the other axial end surface 2D along the axis line L1. The support cylindrical portion 2 is fitted to an unillustrated rotatable shaft so as to be integrally rotated or fitted to an unillustrated fixed shaft so as to be freely rotatable.

The teeth-formed cylindrical portion 4 is so formed that a radial thickness is constant along a circumferential direction. The teeth-formed cylindrical portion 4 includes an inner circumferential surface 4A, a virtual outer peripheral surface 4B, one axial end surface 4C, and the other axial end surface 4D. The one axial end surface 4C and the other axial end surface 4D are perpendicular to the axis line L1 of the support hole 2A. The teeth-formed cylindrical portion 4 extends in a straight line between the one axial end surface 4C and the other axial end surface 4D along the axis line L1. Further, the teeth-formed cylindrical portion 4 is arranged coaxially with the support cylindrical portion 2 on the radially outer side of the support cylindrical portion 2.

In the virtual outer peripheral surface 4B of the teeth-formed cylindrical portion 4, there are formed a plurality of teeth 8. A root circle of the teeth 8 exists on the outer peripheral surface 4B of the teeth-formed cylindrical portion 4. An axial length of the teeth-formed cylindrical portion 4 i.e. a length between the one axial end surface 4C and the other axial end surface 4D is shorter than an axial length of the support cylindrical portion 2, i.e. a length between the one axial end surface 2C and the other axial end surface 2D. A center line passing through an axial center of the support cylindrical portion 2, i.e. a center between the one axial end surface 2C and the other axial end surface 2D and extending in a radial direction corresponds to a center line L2 passing through an axial center of the teeth-formed cylindrical portion 4 i.e. a center between the one axial end surface 4C and the other axial end surface 4D, and extending in a radial direction. The center line L2 extends so as to be perpendicular to the axis line L1. The reference sign C in FIG. 1 indicates a center of the support cylindrical portion 2.

The web 6 has an axial thickness "t", which will be described hereinafter. The web 6 connects the outer peripheral surface 2B of the support cylindrical portion 2 and the inner circumferential surface 4A of the teeth-formed cylindrical portion 4. In the present embodiment, the web 6 is so formed as to have an annular shape and arranged coaxially with the support cylindrical portion 2. As shown in FIG. 1, viewing the gear from an axial direction, a virtual inner circumferential surface of the web 6 corresponds to the outer peripheral surface 2B of the support cylindrical portion 2, and a virtual outer peripheral surface of the web 6 corresponds to the inner circumferential surface 4A of the teeth-formed cylindrical portion 4.

The thickness "t" in an axial direction of the web 6 becomes thinner gradually from the outer peripheral surface 2B of the support cylindrical portion 2 to the inner circumferential surface 4A of the teeth-formed cylindrical portion 4. In the vertical cross section of the gear shown in FIG. 2, the center line passing through an axial center of the web 6 and extending in a radial direction corresponds to the center line L2 previously described above. The center line L2 is a center line in a width direction, i.e. a center line in an axis line direction of the gear, and the axis line L1 is an axis line of the gear. Axially opposite surfaces 6A and 6B of the web 6 are symmetrical about the center line L2 and form a straight line from the outer peripheral surface 2B of the support cylindrical portion 2 to the inner circumferential surface 4A of the teeth-formed cylindrical portion 4. In other words, the axially opposite surfaces 6A and 6B in the axial direction of the web 6 are so formed as to be flat surfaces symmetrically sloping from the outer peripheral surface 2B of the support cylindrical portion 2 to the inner circumferential surface 4A of the teeth-formed cylindrical portion 4 so as to come close to the center line L2 gradually.

The gear is formed by an injection molding. In the injection molding, a synthetic resin is poured into a forming die and cooled for solidification. At this time, when the thickness "t" of the web 6 is constant and thin, the effect of contraction due to solidification becomes small. Accordingly, a required gear accuracy can be secured. However, when the thickness "t" of the web 6 is constant and thin and a length of the web 6 is long, a bearing strength of the teeth 8 is lowered. As a result, this causes a likelihood that a strength of the gear becomes insufficient. Further, when the thickness "t" of the web 6 is constant and thin and a length of the web 6 is long, repletion of synthetic resin to the forming die may be deteriorated at a time when an injection molding is performed to form the gear from a synthetic resin. This may cause a defective molding to thereby lower a yield rate.

On the other hand, in the gear according to the present embodiment, the axial thickness "t" of the web 6 becomes thinner gradually from the outer peripheral surface 2B of the support cylindrical portion 2 to the inner circumferential surface 4A of the teeth-formed cylindrical portion 4. Therefore, though it is not to the extent of the case where the thickness "t" of the web 6 is constant and thin, an effect of the contraction due to solidification of resin at a time of the injection molding becomes smaller than the case where the thickness "t" of the web 6 is constant and thick. Therefore, a required teeth surface accuracy i.e. a gear accuracy is secured. Further, in the present embodiment, since the thickness "t" of the web 6 is thinnest at a portion closest to the teeth-formed cylindrical portion 4, an effect of the contraction due to the solidification of the resin is smaller as compared to a gear in which the thickness "t" is thinnest at a portion far apart from the teeth-formed cylindrical portion 4. Accordingly, an effect of securing a required teeth surface accuracy is likely to be obtained.

Further, in the gear according to the present embodiment, even if the length of the web 6 becomes long, lowering of the bearing strength of the teeth 8 is suppressed as compared to the case where the thickness "t" of the web 6 is constant and thin. Accordingly, a required strength of the gear can be secured. Further, repletion of the synthetic resin to the forming die at a time of forming the gear from a synthetic resin by the injection molding can be favorably secured as compared to the case where the thickness "t" of the web 6 is constant and thin. Accordingly, favorable molding can be conducted, so that the yield rate improves.

Figure 3:
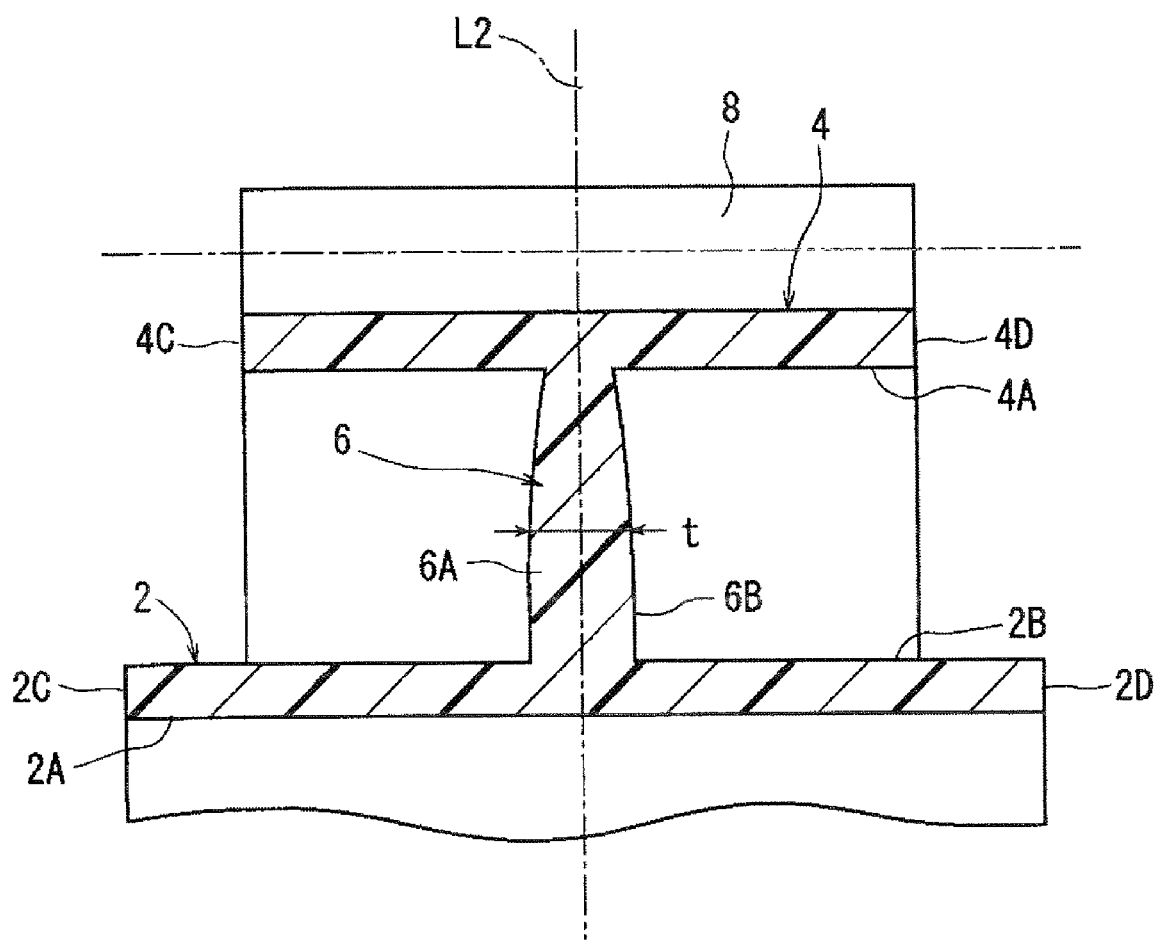
FIG. 3 is a vertical sectional view showing relevant parts of another embodiment of a gear which is configured in accordance with the present invention.

FIG. 3 partially shows another embodiment. In the embodiment shown in FIG. 3, the axial thickness "t" of the web 6 becomes thinner gradually from the outer peripheral surface 2B of the support cylindrical portion 2 to the inner circumferential surface 4A of the teeth-formed cylindrical portion 4. Further, in the present embodiment, the axially opposite surfaces 6A and 6B of the web 6 are symmetrical about the center line L2 and curve from the outer peripheral surface 2B of the support cylindrical portion 2 to the inner circumferential surface 4A of the teeth-formed cylindrical portion 4 in a vertical cross section of the gear.

In particular, each of the axially opposite surfaces 6A and 6B of the web 6 is formed to have convex surfaces. The axially opposite surfaces 6A and 6B of the web 6 extend while firmly curving symmetrically from the outer peripheral surface 2B of the support cylindrical portion 2 to the inner circumferential surface 4A of the teeth-formed cylindrical portion 4 to come close gradually to the center line L2 in a vertical cross section of the gear. Other configurations of the present embodiment are substantially the same as those of the embodiment described with reference to FIGS. 1 and 2. Accordingly, the substantially same portions are identified with the same references signs. Accordingly, description of those will be omitted.

Also in the present embodiment, the axial thickness "t" of the web 6 becomes thinner gradually from the outer peripheral surface 2B of the support cylindrical portion 2 to the inner circumferential surface 4A of the teeth-formed cylindrical portion 4. Accordingly, the effect which is substantially the same as that according to the embodiment described with reference to FIGS. 1 and 2 can be achieved.

Figure 4:
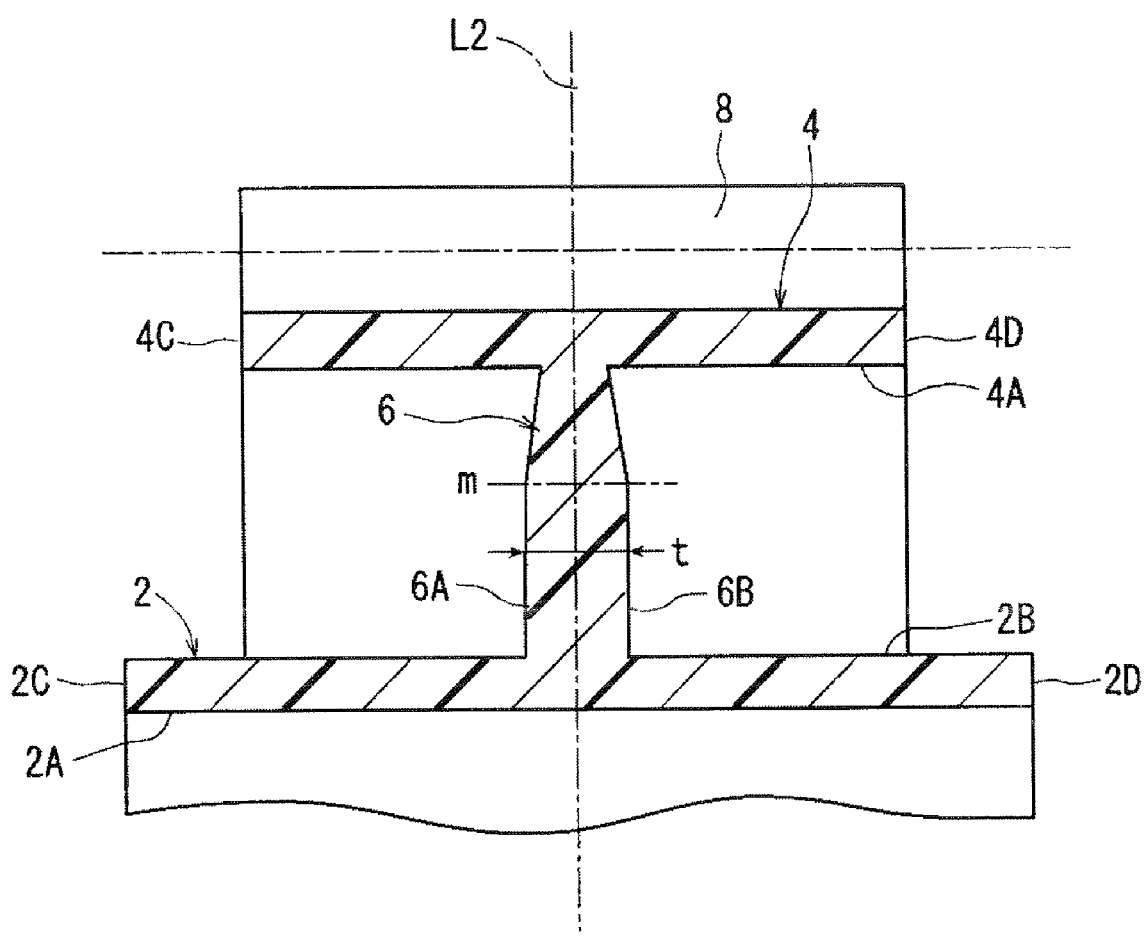
FIG. 4 is a vertical sectional view showing yet another embodiment of a gear which is configured in accordance with the present invention.

FIG. 4 partially shows yet another embodiment. In the embodiment shown in FIG. 4, the axial thickness "t" of the web 6 is constant from the outer peripheral surface 2B of the support cylindrical portion 2 to a radially intermediate position "m" between the outer peripheral surface 2B of the support cylindrical portion 2 and the inner circumferential surface 4A of the teeth-formed cylindrical portion 4, and becomes thinner gradually from the intermediate position "m" to the inner circumferential surface 4A of the teeth-formed cylindrical portion 4.

In particular, the intermediate position "m" is set at a radially center position between the outer peripheral surface 2B of the support cylindrical portion 2 and the inner circumferential surface 4A of the teeth-formed cylindrical portion 4, a position closer to the outer peripheral surface 2B of the support cylindrical portion 2 from the center, or a position closer to the inner circumferential surface 4A of the teeth-formed cylindrical portion 4 from the center. In the embodiment shown in FIG. 4, the intermediate position "m" is set at a position closer to the outer peripheral surface 2B of the support cylindrical portion 2 than the center. In the vertical cross section of the gear, the axially opposite surfaces 6A and 6B of the web 6 are symmetrical about the center line L2 and are in straight lines from the intermediate position "m" to the inner circumferential surface 4A of the teeth-formed cylindrical portion 4. In other words, the axially opposite surfaces 6A and 6B of the web 6 are formed to have flat surfaces sloping symmetrically from the intermediate position "m" to the inner circumferential surface 4A of the teeth-formed cylindrical portion 4 to come close to the center line L2 gradually. Other configurations of the present embodiment are substantially the same as those of the previous embodiment described with reference to FIGS. 1 and 2. Accordingly, the substantially same portions are identified with the same reference signs, and description of those will be omitted.

Also in the present embodiment, the axial thickness "t" of the web 6 becomes thinner gradually from the intermediate position "m" to the inner circumferential surface 4A of the teeth-formed cylindrical portion 4. Accordingly, the effect which is substantially the same as that of the embodiment described with reference to FIGS. 1 and 2 can be achieved.

Figure 5:
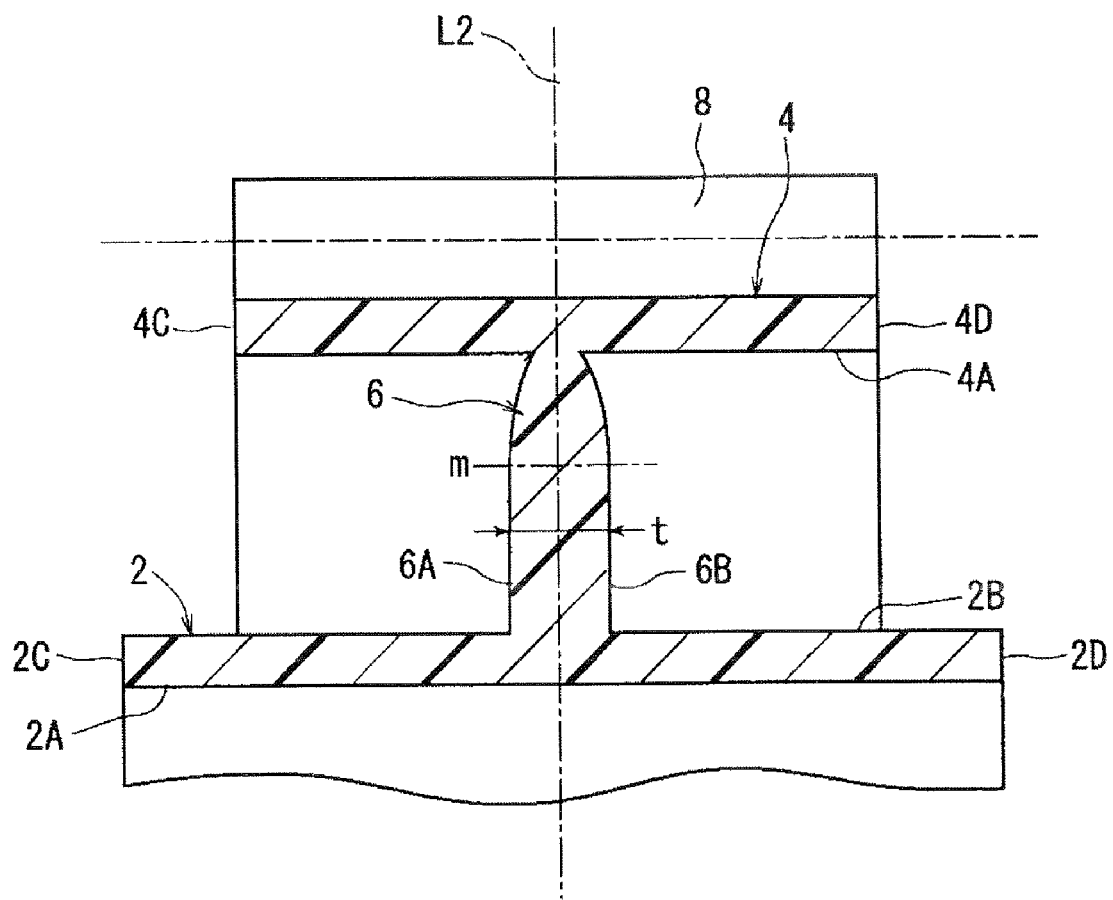
FIG. 5 is a vertical sectional view showing relevant parts of yet another embodiment of a gear which is configured in accordance with the present invention.

FIG. 5 partially shows yet another embodiment. In the embodiment shown in FIG. 5, the axially opposite surfaces 6A and 6B of the web 6 are symmetrical about the center line L2 and curve from the intermediate position "m" to the inner circumferential surface 4A of the teeth-formed cylindrical portion 4 in the vertical cross section of the gear.

In particular, the portion from the intermediate position "m" to the inner circumferential surface 4A of teeth-formed cylindrical portion 4 in each of the axially opposite surfaces 6A and 6B of the web 6 is so formed as to have a convex surface. The axially opposite surfaces 6A and 6B of the web 6 extend while firmly curving in a symmetrical manner from the intermediate position "m" to the inner circumferential surface 4A of the teeth-formed cylindrical portion 4 to come close to the center line L2 gradually in the vertical cross section of the gear. Other configurations of the present embodiment are substantially the same as those of the embodiment described with reference to FIG. 4. Accordingly, the substantially same portions will be identified with the same reference signs, and description of those will be omitted.

Also in this embodiment, the axial thickness "t" of the web 6 becomes thinner from the intermediate position "m" to the inner circumferential surface 4A of the teeth-formed cylindrical portion 4. Accordingly, the effect which is substantially the same as that of the previous embodiment described with reference to FIGS. 1 and 2 can be achieved.

Figure 6:
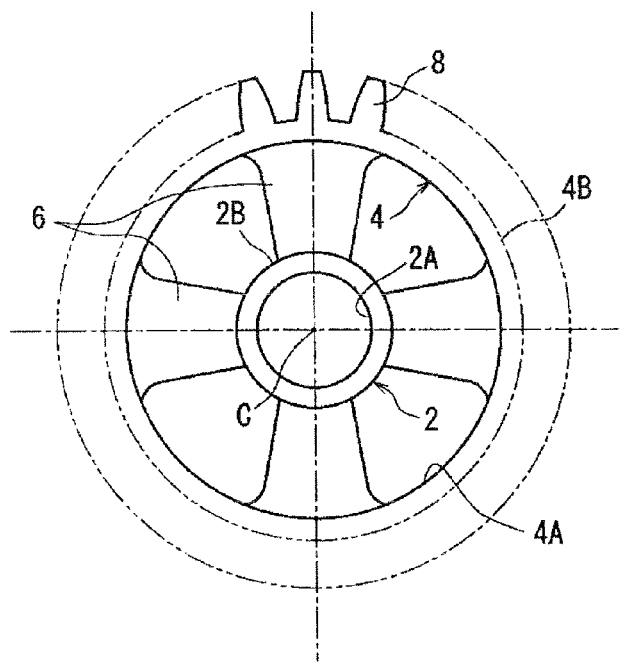
FIG. 6 is a front view schematically showing yet another embodiment of a gear which is configured in accordance with the present invention.

FIG. 6 shows a gear according to yet another embodiment of the present invention. A configuration of the gear shown in FIG. 6 is different from that of the gear shown in FIGS. 1 and 2 only in that a plurality of webs 6 having substantially the same shape and size are provided at equally-spaced intervals in a circumferential direction. In the present embodiment, four webs 6 are provided. Each web 6 is so formed that its width becomes wider from a base end portion to a leading end portion, in other words, from the outer peripheral surface 2B of the support cylindrical portion 2 to the inner circumferential surface 4A of the teeth-formed cylindrical portion 4. Other configurations of the present embodiment are substantially the same as those of the embodiment described with reference to FIGS. 1 and 2. Accordingly, the substantially same portions will be identified with the same reference signs, and description of those will be omitted.

Also in the present embodiment, the axial thickness "t" of each web 6 becomes thinner gradually from the outer peripheral surface 2B of the support cylindrical portion 2 to the inner circumferential surface 4A of the teeth-formed cylindrical portion 4. Accordingly, the effect which is substantially the same as that of the previous embodiment described with reference to FIGS. 1 and 2 can be achieved except for that the strength of the gear is lowered as compared to the previously described embodiment.

Figure 7:
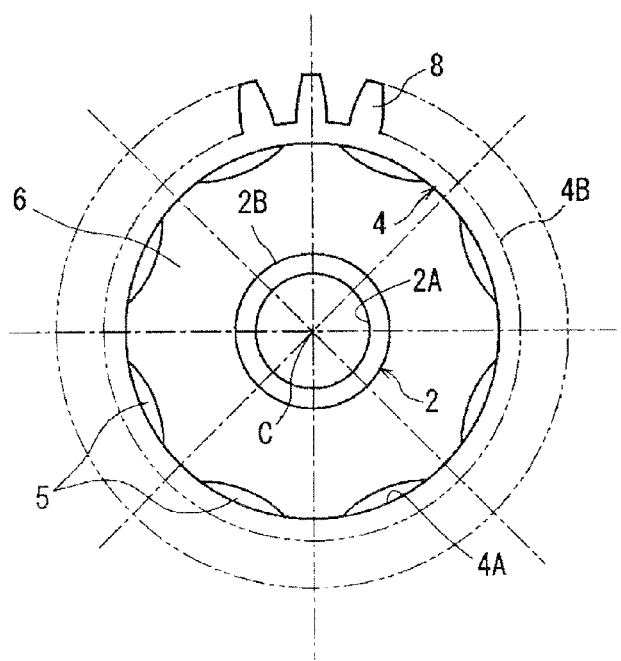
FIG. 7 is a front view schematically showing yet another embodiment of a gear which is configured in accordance with the present invention.

FIG. 7 shows a gear in accordance with yet another embodiment of the present invention. A configuration of the gear shown in FIG. 7 is different from that of the gear shown in FIGS. 1 and 2 only in that a plurality of through holes 5 are formed between the inner circumferential surface 4A of the teeth-formed cylindrical portion 4 and an outer peripheral end of the web 6. The plurality of through holes 5 have substantially the same size and shape. In particular, each through hole 5 is defined by a radially outer arc-shaped surface constituting a part of the inner circumferential surface 4A of the teeth-formed cylindrical portion 4 and a radially inner arc-shaped surface formed in an outer peripheral end of the web 6 corresponding to the radially outer arc-shaped surface. Other configurations of the present embodiment are substantially the same as those of the embodiment described with reference to FIGS. 1 and 2. Accordingly, the substantially same portions are identified with the same reference signs, and description of those will be omitted.

In the present embodiment, the axial thickness "t" of the web 6 becomes thinner gradually from the outer peripheral surface 2B of the support cylindrical portion 2 to the inner circumferential surface 4A of the teeth-formed cylindrical portion 4. Accordingly, the effect which is substantially the same as that of the previous embodiment described with reference to FIGS. 1 and 2 can be achieved except for that the strength of the gear becomes slightly lower than that of the embodiment.

As being clear from the description above, in the embodiments shown in FIGS. 1 through 6, the axial thickness "t" of the web 6 becomes thinner gradually from the outer peripheral surface 2B of the support cylindrical portion 2 to the inner circumferential surface 4A of the teeth-formed cylindrical portion 4. However, the axial thickness "t" of the web 6 in the embodiment shown in FIG. 7 becomes thinner gradually from the outer peripheral surface 2B of the support cylindrical portion 2 to the inner circumferential surface 4A of the teeth-formed cylindrical portion 4 in the area where the through holes 5 are not formed, and the axial thickness "t" of the web 6 becomes thinner gradually from the outer peripheral surface 2B of the support cylindrical portion 2 to the radially inner arc-shaped surface formed in the outer peripheral end of the web 6 in the area where the through holes 5 are formed. Accordingly, the idea that the axial thickness "t" of at least a part of the web 6 becomes thinner gradually from the outer peripheral surface 2B of the support cylindrical portion 2 to the inner circumferential surface 4A of the teeth-formed cylindrical portion 4 includes both the embodiments shown in FIGS. 1 through 6 and the embodiment shown in FIG. 7. This will be similarly applied to other embodiments which will be described herebelow.

Figure 8:
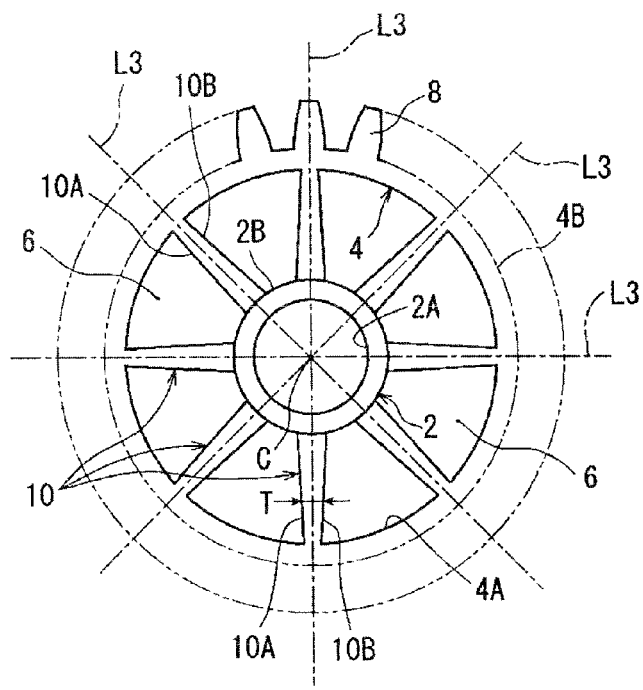
FIG. 8 is a front view schematically showing yet another embodiment of a gear which is configured in accordance with the present invention.
Figure 9:
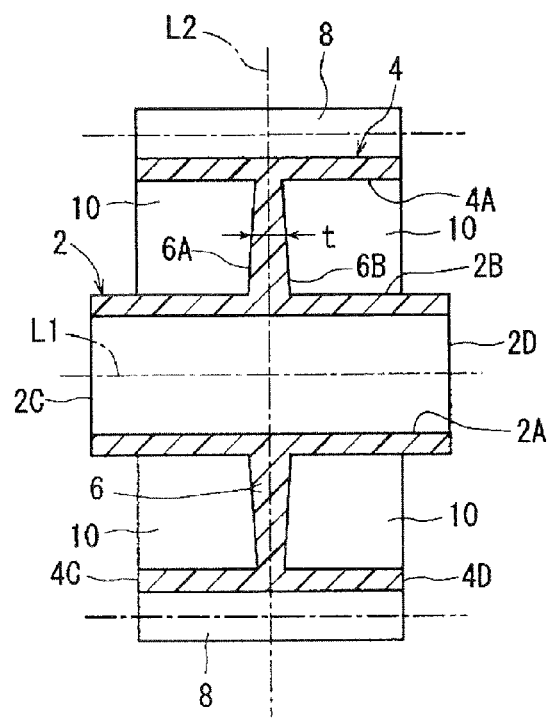
FIG. 9 is a vertical sectional view of the gear shown in FIG. 8.

FIGS. 8 and 9 show a gear according to yet another embodiment of the present invention. A configuration of the gear shown in FIGS. 8 and 9 is different from that of the gear shown in FIGS. 1 and 2 only in that a plurality of radial ribs 10 are provided. In the present embodiment, eight radial ribs 10 are provided.

In particular, the gear shown in FIGS. 8 and 9 is provided with eight radial ribs 10 connecting the outer peripheral surface 2B of the support cylindrical portion 2 and the inner circumferential surface 4A of the teeth-formed cylindrical portion 4 at intervals in a circumferential direction. The radial ribs 10 have substantially the same shape and size. In particular, each radial rib 10 extends in a straight line in the direction of the axis line L1 from the one axial end surface 4C of the teeth-formed cylindrical portion 4 to the other axial end surface 4D of the teeth-formed cylindrical portion 4 across the web 6. The circumferential thickness T of each radial rib 10 becomes thinner gradually from the outer peripheral surface 2B of the support cylindrical portion 2 to the inner circumferential surface 4A of the teeth-formed cylindrical portion 4.

As shown in FIG. 8, viewing the gear from the direction of the axis line, a center line L3 passing through a circumferential center of each radial rib 10 and extending in the radial direction passes through an axis center C of the support cylindrical portion 2. Further, circumferentially opposite surfaces 10A and 10B of each radial rib 10 are symmetrical about the center line L3 and form a straight line from the outer peripheral surface 2B of the support cylindrical portion 2 to the inner circumferential surface 4A of the teeth-formed cylindrical portion 4. In other words, viewing the gear from the direction of the axis line, the circumferentially opposite surfaces 10A and 10B of each radial rib 10 are so forms as to have flat surfaces symmetrically sloping from the outer peripheral surface 2B of the support cylindrical portion 2 to the inner circumferential surface 4A of the teeth-formed cylindrical portion 4 to come close to the center line L3 gradually. Other configurations of the present embodiment are substantially the same as those of the previous embodiment described with reference to FIGS. 1 and 2. Accordingly, the same reference signs are provided to the substantially same portions, and description of those will be omitted.

In the present embodiment, the radial ribs 10 are provided to improve bearing strength of the teeth 8, so that the strength of the gear is further improved. In the present embodiment, the circumferential thickness T of each radial rib 10 becomes thinner gradually from the outer peripheral surface 2B of the support cylindrical portion 2 to the inner circumferential surface 4A of the teeth-formed cylindrical portion 4. Accordingly, as compared to the case where the circumferential thickness T of each radial rib 10 is constant and thick, each radial rib 10 is less likely to be affected by contraction due to solidification of resin at a time of the injection molding. Therefore, a required teeth surface accuracy, in other words, a gear accuracy is secured. Further, in the present embodiment, the thickness T of the radial rib 10 is the thinnest in a portion closest to the teeth-formed cylindrical portion 4. Accordingly, as compared to the gear whose thickness T is thin at a part far apart from the teeth-formed cylindrical portion 4, it is less likely to be affected by contraction due to solidification of the resin, so that an effect of securing a required teeth surface accuracy can be achieved easily. Further, in the present embodiment, like the previous embodiment described with reference to FIGS. 1 and 2, the axial thickness "t" of the web 6 becomes thinner gradually as it goes from the outer peripheral surface 2B of the support cylindrical portion 2 to the inner circumferential surface 4A of the teeth-formed cylindrical portion 4. Thus, in the present embodiment, the effect which is substantially the same as that of the previous embodiment described with reference to FIGS. 1 and 2 can be achieved by the configuration of the radial ribs 10 and web 6, and strength of the gear is further improved.

Figure 10:
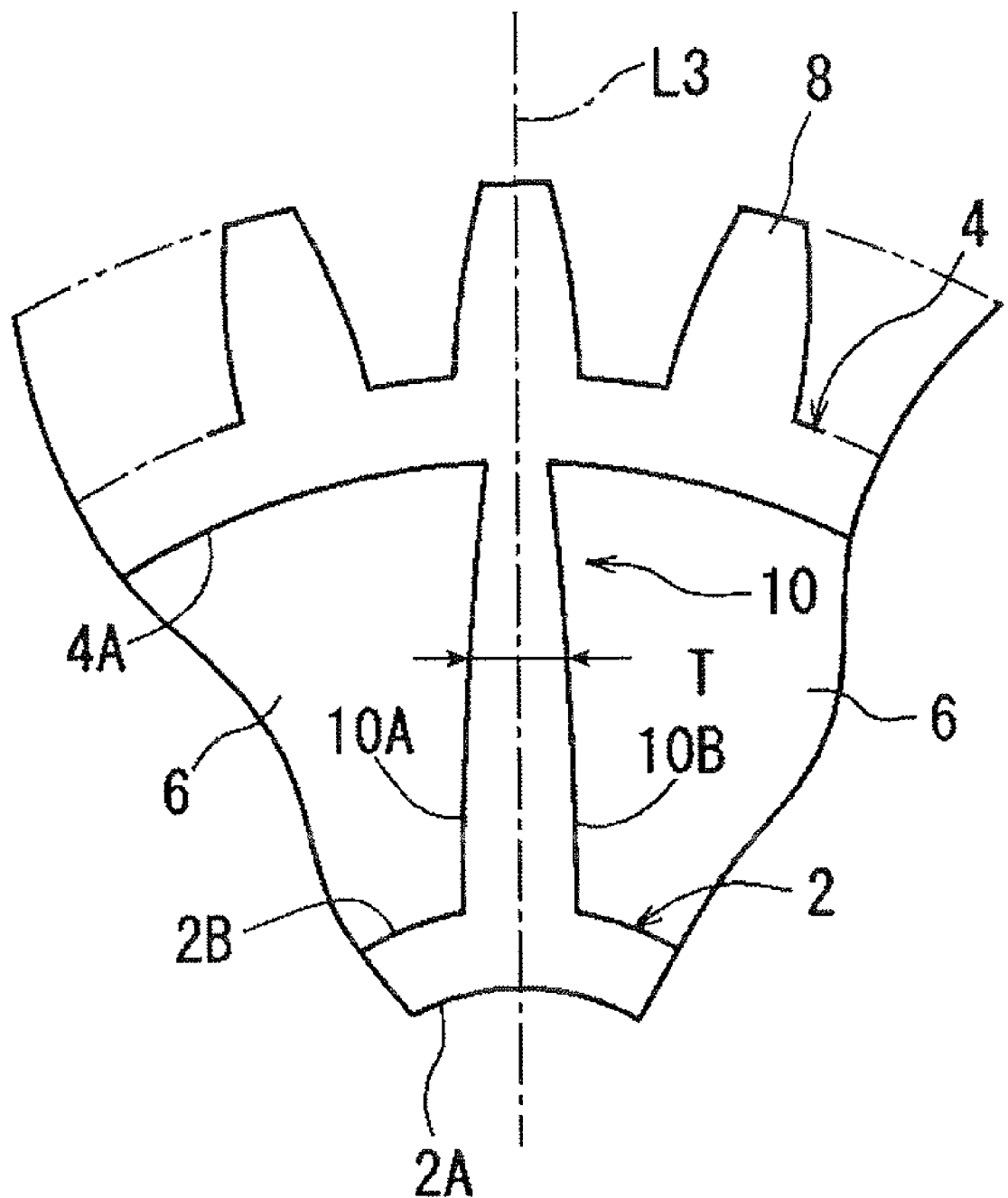
FIG. 10 is a front view schematically showing relevant parts of yet another embodiment of a gear which is configured in accordance with the present invention.

FIG. 10 partially shows yet another embodiment. In the embodiment shown in FIG. 10, viewing the gear from the direction of the axis line, circumferentially opposite surfaces 10A and 10B of each radial rib 10 are symmetrical about the center line L3 and curves from the outer peripheral surface 2B of the support cylindrical portion 2 to the inner circumferential surface 4A of the teeth-formed cylindrical portion 4.

In particular, the circumferentially opposite surfaces 10A and 10B of each radial rib 10 are formed to have convex surfaces. Viewing the gear from the direction of the axis line, the circumferentially opposite surfaces 10A and 10B of each radial rib 10 firmly curve symmetrically from the outer peripheral surface 2B of the support cylindrical portion 2 to the inner circumferential surface 4A of the teeth-formed cylindrical portion 4 so as to come close to the center line L3 gradually. Other configurations of the present embodiment are substantially the same as those of the previous embodiment described with reference to FIGS. 8 and 9. Accordingly, the substantially same portions are identified with the same reference signs, and description of those will be omitted.

Also in the present embodiment, the axial thickness "t" of the web 6 becomes thinner gradually from the outer peripheral surface 2B of the support cylindrical portion 2 to the inner circumferential surface 4A of the teeth-formed cylindrical portion 4, and the circumferential thickness T of each radial rib 10 becomes thinner gradually as it goes from the outer peripheral surface 2B of the support cylindrical portion 2 to the inner circumferential surface 4A of the teeth-formed cylindrical portion 4. Accordingly, the effect which is substantially the same as that of the previous embodiment described with reference to FIGS. 1 and 2 can be achieved, and the strength of the gear is further improved.

Figure 11:
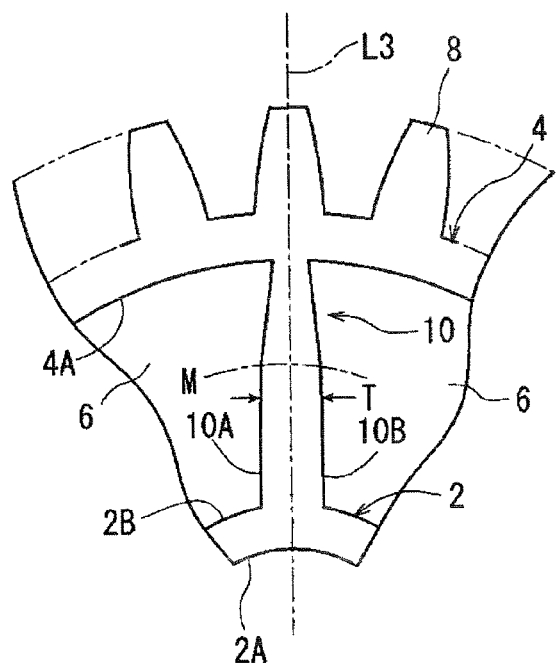
FIG. 11 is a front view schematically showing relevant parts of yet another embodiment of a gear which is configured in accordance with the present invention.

FIG. 11 partially shows yet another embodiment. In the embodiment shown in FIG. 11, the circumferential thickness T of each radial rib 10 is constant from the outer peripheral surface 2B of the support cylindrical portion 2 to a radially intermediate position M between the outer peripheral surface 2B of the support cylindrical portion 2 and the inner circumferential surface 4A of the teeth-formed cylindrical portion 4 and becomes gradually thinner from the intermediate position M to the inner circumferential surface 4A of the teeth-formed cylindrical portion 4.

In particular, the intermediate position M is set at a radially center position set between the outer peripheral surface 2B of the support cylindrical portion 2 and the inner circumferential surface 4A of the teeth-formed cylindrical portion 4, a position closer to the outer peripheral surface 2B of the support cylindrical portion 2 from the center, or a position closer to the inner circumferential surface 4A of the teeth-formed cylindrical portion 4 from the center. In the embodiment shown in FIG. 11, the intermediate position M is set at a position closer to the outer peripheral surface 2B of the support cylindrical portion 2 from the center. Viewing the gear from the direction of the axis line, the circumferentially opposite surfaces 10A and 10B of each radial rib 10 are symmetrical about the center line L3 and are in a straight line from the intermediate position M to the inner circumferential surface 4A of the teeth-formed cylindrical portion 4. In other words, viewing the gear from the direction of the axis line, the circumferentially opposite surfaces 10A and 10B of each radial rib 10 are formed to have flat surfaces sloping symmetrically from the intermediate position M to the inner circumferential surface 4A of the teeth-formed cylindrical portion 4 to come close to the center line L3 gradually. Other configurations of the present embodiment are substantially the same as those of the previous embodiment described with reference to FIGS. 8 and 9. Accordingly, the substantially same portions will be identified with the same reference signs, and description of those will be omitted.

Also in the present embodiment, the axial thickness "t" of the web 6 becomes thinner gradually from the outer peripheral surface 2B of the support cylindrical portion 2 to the inner circumferential surface 4A of the teeth-formed cylindrical portion 4, and the circumferential thickness T of each radial rib 10 is constant from the outer peripheral surface 2B of the support cylindrical portion 2 to the circumferentially intermediate position M" between the outer peripheral surface 2B of the support cylindrical portion 2 and the inner circumferential surface 4A of the teeth-formed cylindrical portion 4 and becomes thinner gradually from the intermediate position M to the inner circumferential surface 4A of the teeth-formed cylindrical portion 4. Accordingly, the effect which is substantially the same as that of the previous embodiment described with reference to FIGS. 1 and 2 can be achieved, and the strength of the gear is further improved.

Figure 12:
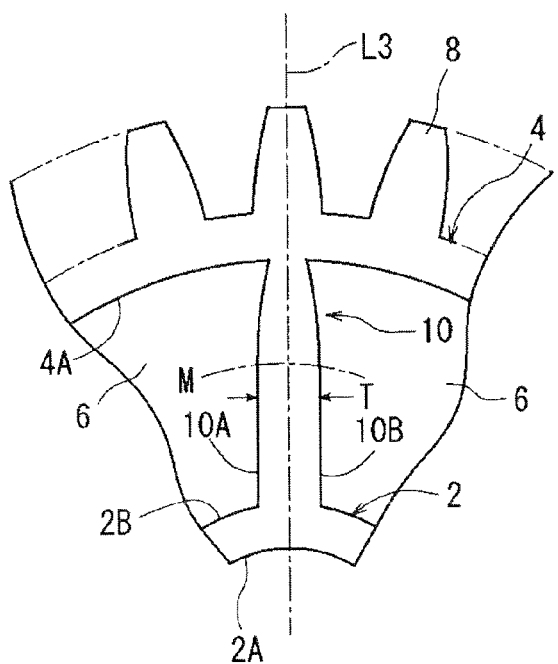
FIG. 12 is a front view schematically showing relevant parts of yet another embodiment of a gear which is configured in accordance with the present invention.

FIG. 12 partially shows yet another embodiment. In the embodiment of FIG. 12, viewing the gear from the direction of the axis line, the circumferentially opposite surfaces 10A and 10B of each radial rib 10 are symmetrical about the center line L3 and curves from the intermediate position M to the inner circumferential surface 4A of the teeth-formed cylindrical portion 4.

In particular, a portion between the intermediate position M and the inner circumferential surface 4A of the teeth-formed cylindrical portion 4 of the circumferentially opposite surfaces 10A and 10B of each radial rib 10 are formed to have convex surfaces. Viewing the gear from the direction of the axis line, the circumferentially opposite surfaces 10A and 10B of each radial rib 10 firmly curve symmetrically from the intermediate position M to the inner circumferential surface 4A of the teeth-formed cylindrical portion 4 so as to come close to the center line L3 gradually. Other configurations of the present embodiment are substantially the same as those of the embodiment described with reference to FIGS. 8 and 9. Accordingly, the substantially same portions are identified with the same reference signs, and description of those will be omitted.

Also in the present embodiment, the axial thickness "t" of the web 6 becomes thinner gradually as from the outer peripheral surface 2B of the support cylindrical portion 2 to the inner circumferential surface 4A of the teeth-formed cylindrical portion 4, and the circumferential thickness T of each radial rib 10 is constant from the outer peripheral surface 2B of the support cylindrical portion 2 to the circumferentially intermediate position M between the outer peripheral surface 2B of the support cylindrical portion 2 and the inner circumferential surface 4A of the teeth-formed cylindrical portion 4 and becomes thinner gradually from the intermediate position M to the inner circumferential surface 4A of the teeth-formed cylindrical portion 4. Accordingly, the effect which is substantially the same as that of the previous embodiment described with reference to FIGS. 1 and 2 can be achieved, and the strength of the gear is further improved.

In the embodiments shown in FIGS. 8 through 12, the configuration of the web 6 is substantially the same as the configuration of the web 6 of the gear described with reference to FIGS. 1 and 2. However, there are embodiments in which configurations of the web 6 are substantially the same as any of configurations of the web 6 shown in FIGS. 3 through 5. Also in these embodiments, the effect which is substantially the same as that of the previous embodiment described with reference to FIGS. 1 and 2 can be achieved, and the strength of the gear is further improved.

Figure 13:
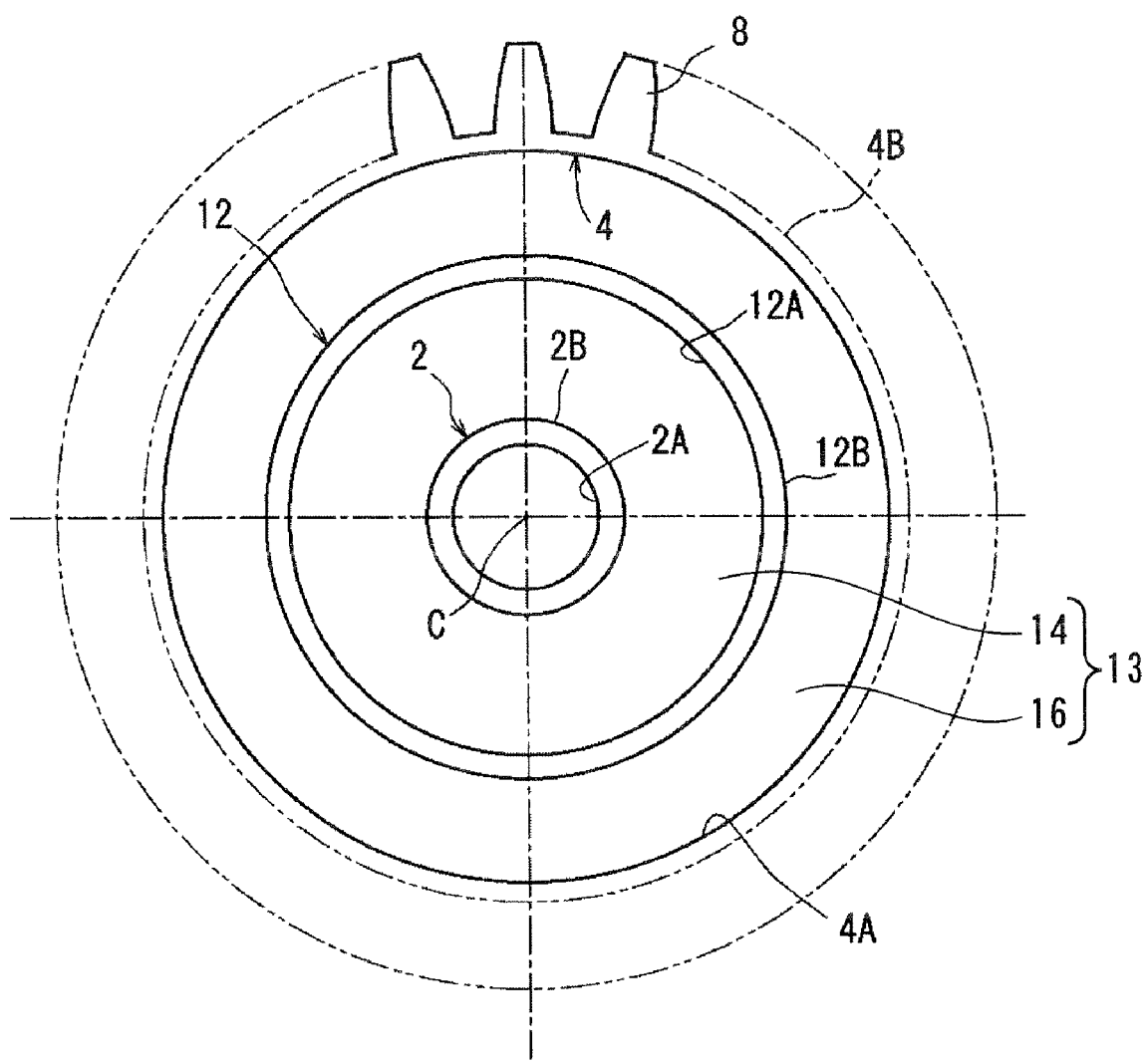
FIG. 13 is a front view schematically showing yet another embodiment of a gear which is configured in accordance with the present invention.
Figure 14:
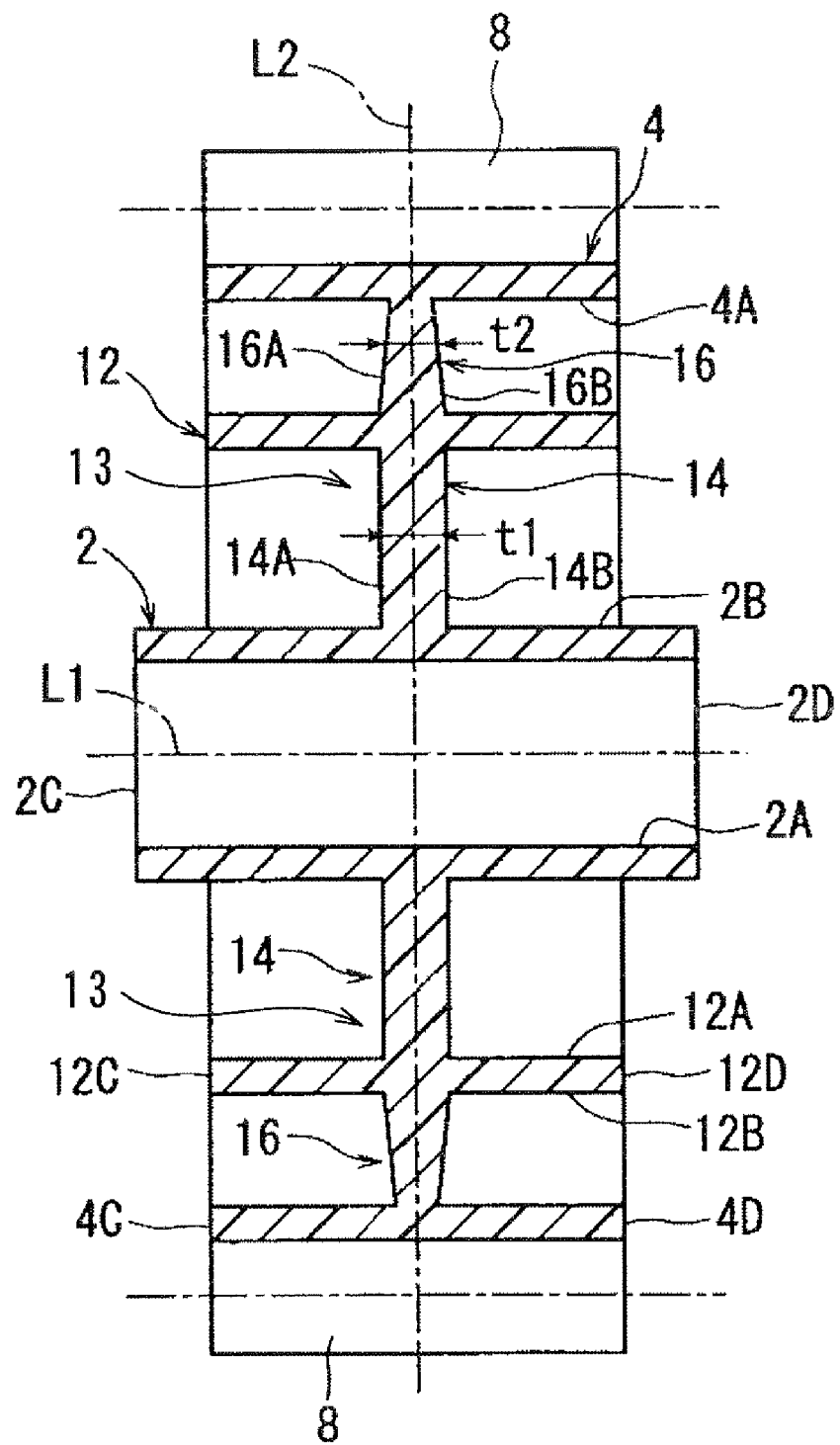
FIG. 14 is a vertical sectional view of the gear shown in FIG. 13.

FIGS. 13 and 14 show a gear in accordance with yet another embodiment of the present invention. The gear shown in FIGS. 13 and 14 includes the support cylindrical portion 2, the teeth-formed cylindrical portion 4, an intermediate cylindrical portion 12, and a web 13. The support cylindrical portion 2 and the teeth-formed cylindrical portion 4 have configurations which are substantially the same as those of the previous embodiment described with reference to FIGS. 1 and 2. Accordingly, the substantially same portions will be identified with the same reference signs, and further description of those will be omitted.

The intermediate cylindrical portion 12 is so formed that a radial thickness is constant along a circumferential direction. The intermediate cylindrical portion 12 includes an inner circumferential surface 12A, an outer peripheral surface 12B, one axial end surface 12C, and the other axial end surface 12D. The one axial end surface 12C and the other axial end surface 12D are perpendicular to an axis line L1 of the support hole 2A of the support cylindrical portion 2. The intermediate cylindrical portion 12 extends in a straight line between the one axial end surface 12C and the other axial end surface 12D along the axis line L1. Further, the intermediate cylindrical portion 12 is arranged in a radially intermediate position between the support cylindrical portion 2 and the teeth-formed cylindrical portion 4 coaxially with the support cylindrical portion 2.

An axial length of the intermediate cylindrical portion 12, i.e. a length between the one axial end surface 12C and the other axial end surface 12D is the same as an axial length of the teeth-formed cylindrical portion 4 i.e. a length between the one axial end surface 4C and the other axial end surface 4D and, on the other hand, is shorter than an axial length of the support cylindrical portion 2 i.e. a length between the one axial end surface 2C and the other axial end surface 2D. A center line L2 passing through an axial center of the support cylindrical portion 2, i.e. a center between the one axial end surface 2C and the other end surface 2D and extending in the radial direction corresponds to the center line L2 passing through an axial center of the teeth-formed cylindrical portion 4 i.e. a center between the one axial end surface 4C and the other axial end surface 4D and an axial center of the intermediate cylindrical portion 12 i.e. a center between the one axial end surface 12C and the other axial end surface 12D and extending in the radial direction. The center line L2 extends so as to be perpendicular to the axis line L1. The reference sign C in FIG. 13 indicates a center of the support cylindrical portion 2.

The web 13 includes a first web 14 and a second web 16.

The first web 14 connects the outer peripheral surface 2B of the support cylindrical portion 2 and the inner circumferential surface 12A of the intermediate cylindrical portion 12. The first web 14 has an axial thickness t1, which will be described herebelow, and is formed to have an annular shape. Further, the first web 14 is so arranged as to be coaxial with the support cylindrical portion 2. As shown in FIG. 13, viewing the gear from the axial direction, a virtual inner circumferential surface of the first web 14 corresponds to the outer peripheral surface 2B of the support cylindrical portion 2. On the other hand, a virtual outer peripheral surface of the first web 14 corresponds to the inner circumferential surface 12A of the intermediate cylindrical portion 12.

As shown in FIG. 14, the axial thickness t1 of the first web 14 is constant from the outer peripheral surface 2B of the support cylindrical portion 2 to the inner circumferential surface 12A of the intermediate cylindrical portion 12. In the vertical cross section of the gear shown in FIG. 14, a center line passing through the axial center of the first web 14 and extending in the radial direction corresponds to the previously described center line L2. The center line L2 is a center line in a width direction of the gear, i.e. a center line in the direction of the axis line L1, and the axis line L1 is an axis line of the gear.

The second web 16 connects the outer peripheral surface 12B of the intermediate cylindrical portion 12 and the inner circumferential surface 4A of the teeth-formed cylindrical portion 4. The second web 16 has an axial thickness t2, which will be described hereinafter, and is so formed as to have an annular shape. Further, the second web 16 is so arranged as to be coaxial with the support cylindrical portion 2. As shown in FIG. 13, viewing the gear from the axial direction, a virtual inner circumferential surface of the second web 16 corresponds to the outer peripheral surface 12B of the intermediate cylindrical portion 12. On the other hand, a virtual outer peripheral surface of the second web 16 corresponds to the inner circumferential surface 4A of the teeth-formed cylindrical portion 4.

As shown in FIG. 14, the axial thickness t2 of the second web 16 becomes thinner gradually from the outer peripheral surface 12B of the intermediate cylindrical portion 12 to the inner circumferential surface 4A of the teeth-formed cylindrical portion 4. In the vertical cross section of the gear shown in FIG. 14, the center line passing through the axial center of the second web 16 and extending in the radial direction corresponds to the previously described center line L2. The axially opposite surfaces 16A and 16B of the second web 16 are symmetrical about the center line L2 and are in straight lines from the outer peripheral surface 12B of the intermediate cylindrical portion 12 to the inner circumferential surface 4A of the teeth-formed cylindrical portion 4. In other words, the axially opposite surfaces 16A and 16B of the second web 16 are so formed as to have flat surfaces sloping symmetrically from the outer peripheral surface 12B of the intermediate cylindrical portion 12 to the inner circumferential surface 4A of the teeth-formed cylindrical portion 4 so as to come close to the center line L2 gradually.

In the present embodiment, the axial thickness t2 of the second web 16 becomes thinner gradually from the outer peripheral surface 12B of the intermediate cylindrical portion 12 to the inner circumferential surface 4A of the teeth-formed cylindrical portion 4. Accordingly, the effect which is substantially the same as that of the previous embodiment described with reference to FIGS. 1 and 2 can be achieved, and existence of the intermediate cylindrical portion 12, the first web 14, and the second web 16 further improves the strength of the gear.

In the embodiment shown in FIGS. 13 and 14, there is another embodiment in which a configuration of the second web 16 is substantially the same as any of the configurations of the web 6 shown in FIGS. 3 through 5.

Figure 15:
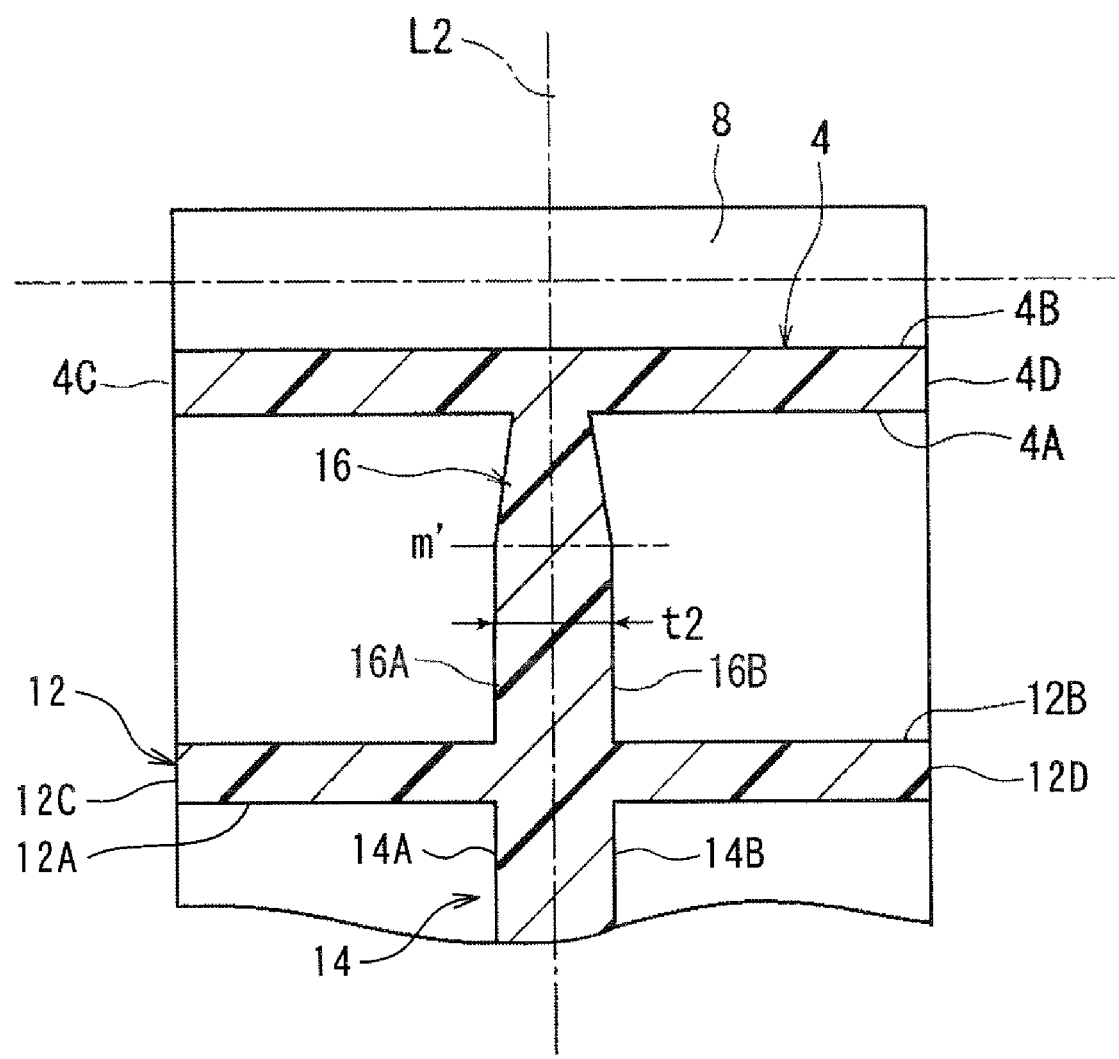
FIG. 15 is a vertical sectional view schematically showing relevant parts of yet another embodiment of a gear which is configured in accordance with the present invention.
Figure 16:
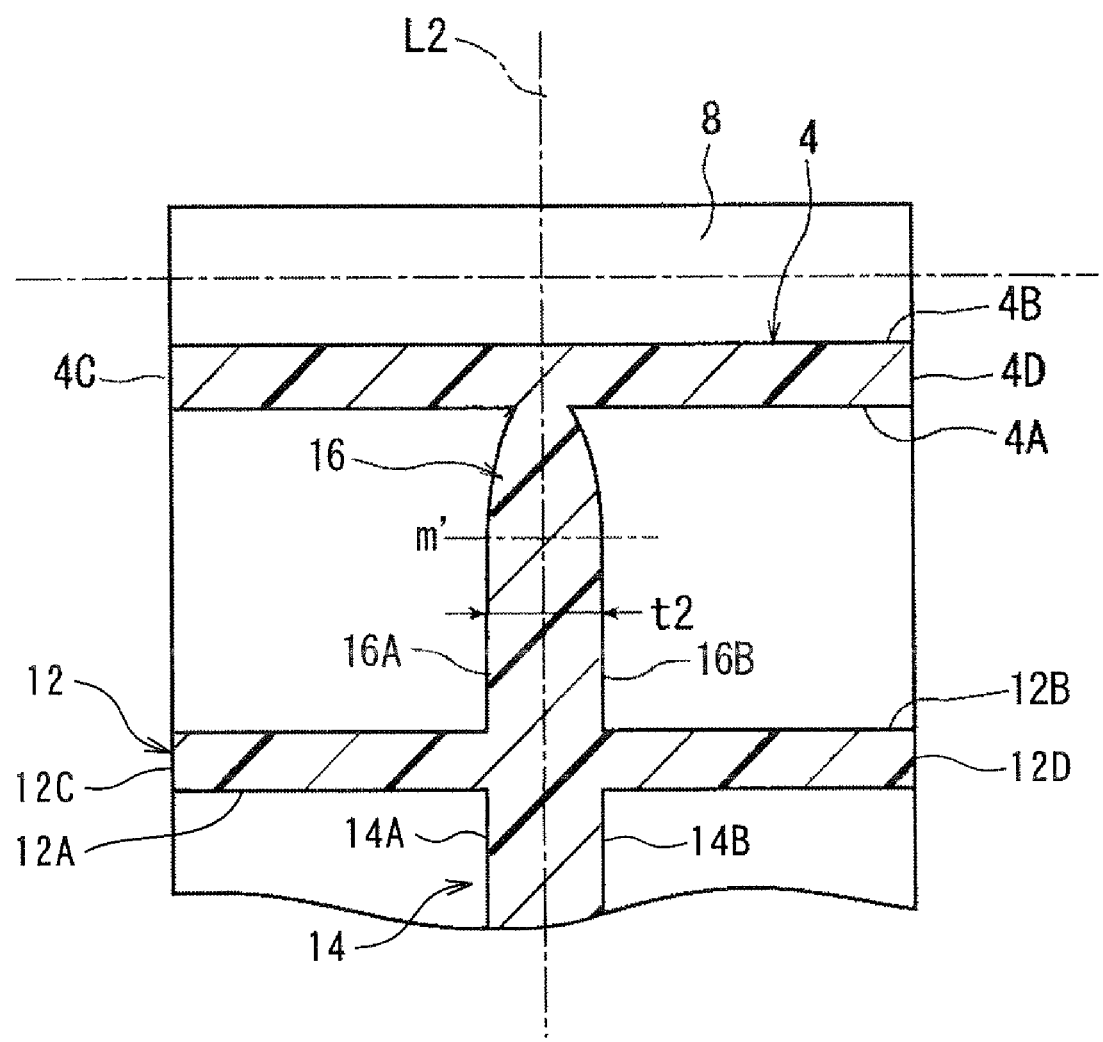
FIG. 16 is a vertical sectional view showing relevant parts of yet another embodiment of a gear which is configured in accordance with the present invention.

In other words, there is an embodiment in which the axially opposite surfaces 16A and 16B of the second web 16 are symmetrical about the center line L2 similarly to the web 6 shown in FIG. 3 and curve from the outer peripheral surface 12B of the intermediate cylindrical portion 12 to the inner circumferential surface 4A of the teeth-formed cylindrical portion 4 gradually so as to come close to the center line L2. Further, as shown in FIGS. 15 and 16, there is another embodiment in which the axial thickness t2 of the second web 16 is constant from the outer peripheral surface 12B of the intermediate cylindrical portion 12 to a radially intermediate position m' between the outer peripheral surface 12B of the intermediate cylindrical portion 12 and the inner circumferential surface 4A of the teeth-formed cylindrical portion 4 and becomes thinner gradually from the intermediate position m' to the inner circumferential surface 4A of the teeth-formed cylindrical portion 4. In the embodiment shown in FIG. 15, the axially opposite surfaces 16A and 16B of the second web 16 are symmetrical about the center line L2 similarly to the web 6 shown in FIG. 4, and are so formed as to have flat surfaces sloping in straight lines from the intermediate position m' to the inner circumferential surface 4A of the teeth-formed cylindrical portion 4. On the other hand, in the embodiment shown in FIG. 16, the axially opposite surfaces 16A and 16B of the second web 16 are symmetrical about the center line L2 and curve from the intermediate position m' to the inner circumferential surface 4A of the teeth-formed cylindrical portion 4 so as to come close to the center line L2 gradually, similarly to the web 6 shown in FIG. 5.

Also in these embodiments, the effect which is substantially the same as that of the previous embodiment described with reference to FIGS. 1 and 2 can be achieved, and existence of the intermediate cylindrical portion 12 further improves the strength of the gear. Further, there is another embodiment in which the configuration of the first web 14 and/or the second web 16 is substantially the same as the configuration of the web 6 shown in FIG. 6 or 7.

Figure 17:
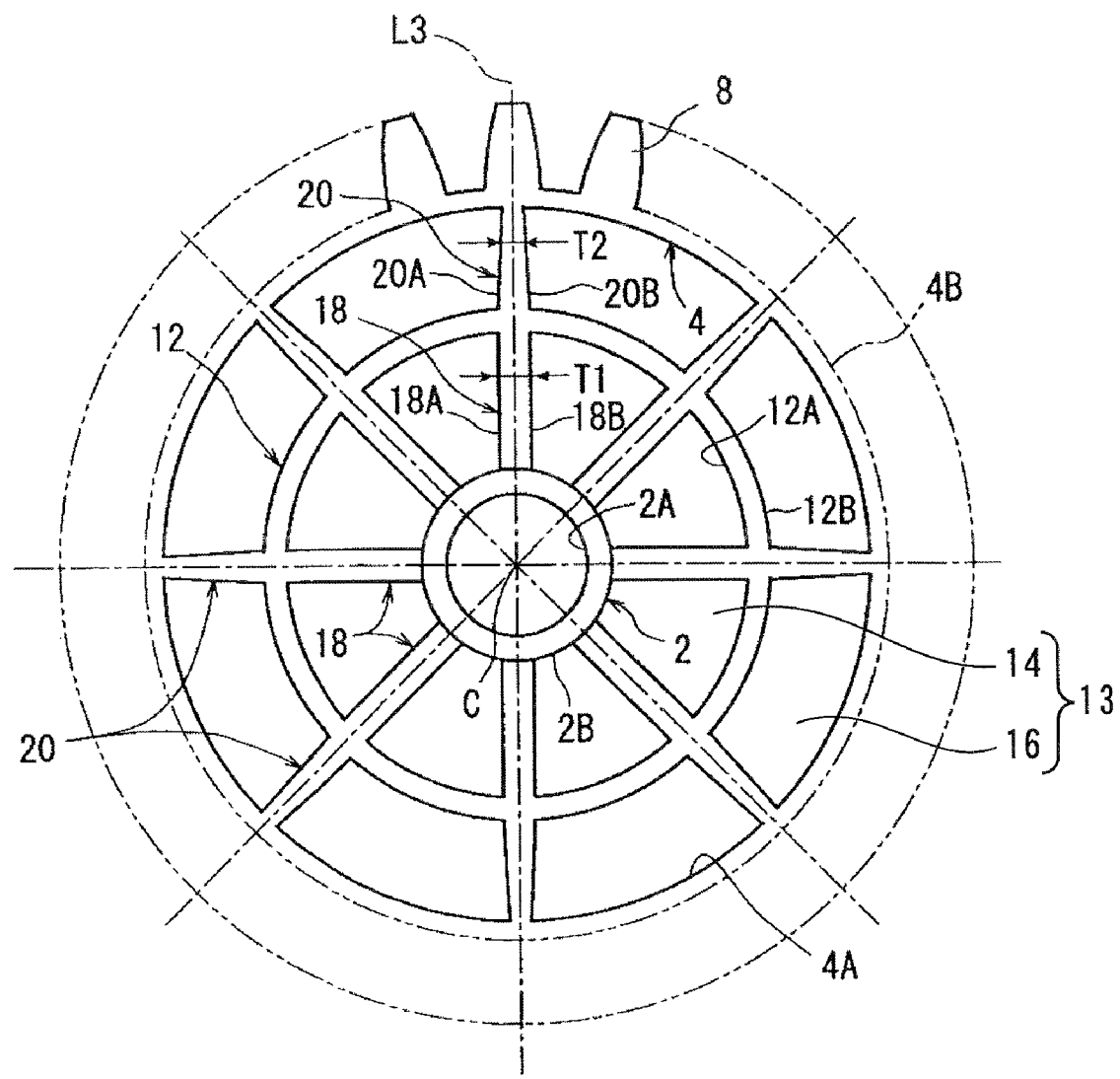
FIG. 17 is a front view schematically showing yet another embodiment of a gear which is configured in accordance with the present invention.
Figure 18:
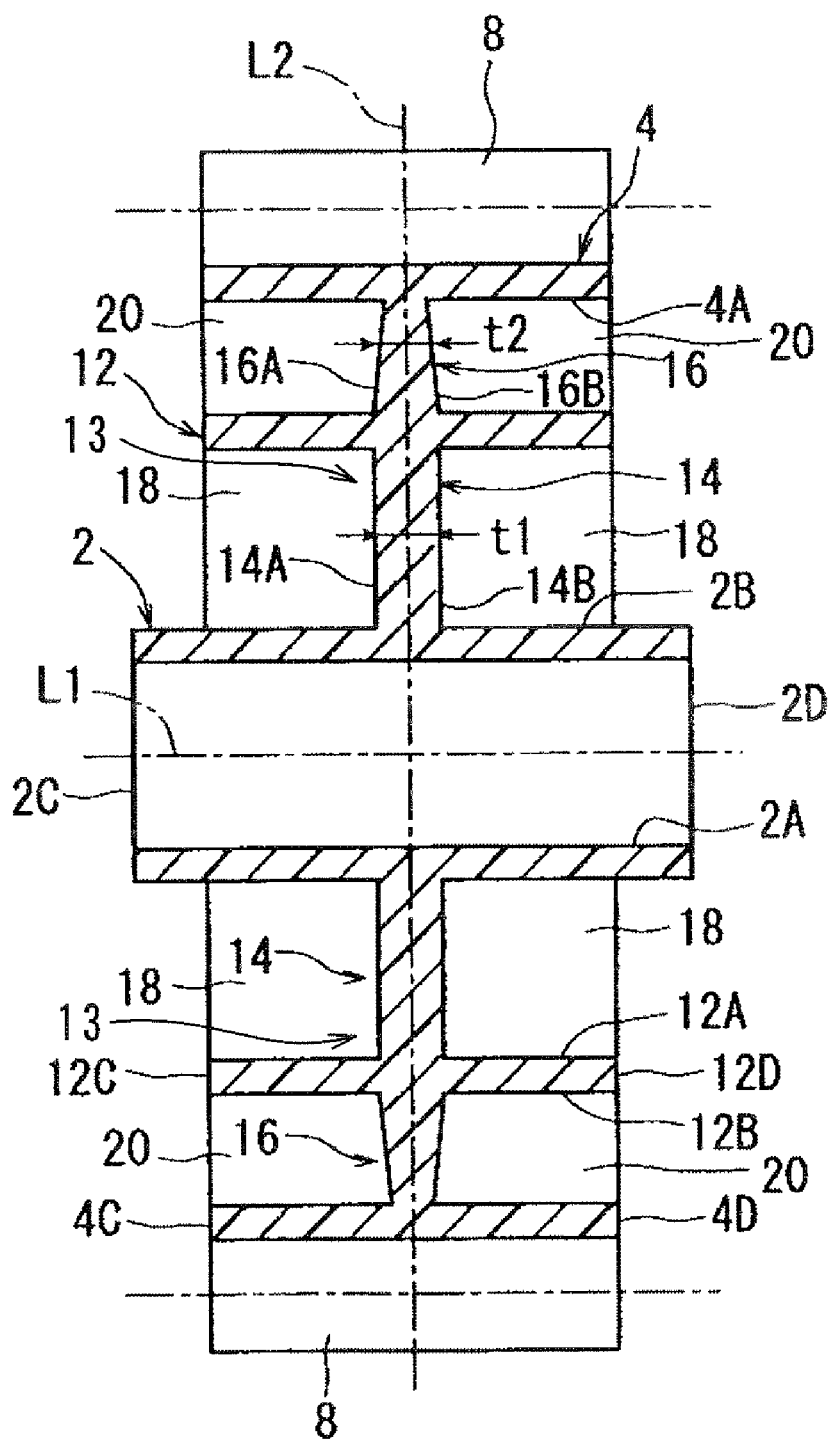
FIG. 18 is a vertical sectional view of the gear shown in FIG. 17.

FIGS. 17 and 18 show a gear in accordance with yet another embodiment of the present invention. A configuration of the gear shown in FIGS. 17 and 18 is different from the gear shown in FIGS. 13 and 14 only in that a plurality of first radial ribs 18 and a plurality of second radial ribs 20 are provided.

In particular, the gear shown in FIGS. 17 and 18 includes a plurality of first radial ribs 18 connecting the outer peripheral surface 2B of the support cylindrical portion 2 and the inner circumferential surface 12A of the intermediate cylindrical portion 12 and a plurality of second radial ribs 20 connecting the outer peripheral surface 12B of the intermediate cylindrical portion 12 and the inner circumferential surface 4A of the teeth-formed cylindrical portion 4 are provided respectively in the circumferential direction at equally-spaced intervals. In the present embodiment, eight first radial ribs 18 and eight second radial ribs 20 are provided.

The first radial ribs 18 have substantially the same shape and size. Each first radial rib 18 extends from the one axial end surface 12C of the intermediate cylindrical portion 12 to the other axial end surface 12D across the first web 14 in a straight line in the direction of the axis line L1.

The second radial ribs 20 have substantially the same shape and size. Each second radial rib 20 extends in a straight line from the one axial end surface 12C of the intermediate cylindrical portion 12 and the one axial end surface 4C of the teeth-formed cylindrical portion 4 to the other axial end surface 12D of the intermediate cylindrical portion 12 and the other axial end surface 4D of the teeth-formed cylindrical portion 4 across the second web 16 in the direction of the axis line L1. Each second radial rib 20 exists on an outward extension in the radial direction of each first radial rib 18.

The circumferential thickness T1 of each first radial rib 18 is constant from the outer peripheral surface 2B of the support cylindrical portion 2 to the inner circumferential surface 12A of the intermediate cylindrical portion 12. Further, the circumferential thickness T2 of each second radial rib 20 becomes thinner gradually from the outer peripheral surface 12B of the intermediate cylindrical portion 12 to the inner circumferential surface 4A of the teeth-formed cylindrical portion 4.

As shown in FIG. 17, viewing the gear from the axial direction, the center line L3 of each of the first radial rib 18 and the second radial rib 20 passing through the center of the first radial rib 18 and the second radial rib 20 in the circumferential direction and extending in the radial direction is so positioned as to pass through the axis center C of the support cylindrical portion 2. The circumferentially opposite surfaces 20A and 20B of each second radial rib 20 are symmetrical about the center line L3 and extend in a straight line from the outer peripheral surface 12B of the intermediate cylindrical portion 12 to the inner circumferential surface 4A of the teeth-formed cylindrical portion 4. In other words, viewing the gear from the axial direction, the circumferentially opposite surfaces 20A and 20B of each second radial rib 20 are so formed as to have flat surfaces sloping symmetrically from the outer peripheral surface 12B of the intermediate cylindrical portion 12 to the inner circumferential surface 4A of the teeth-formed cylindrical portion 4 so as to come close to the center line L3 gradually. Other configurations of the present embodiment are substantially the same as the previous embodiment described with reference to FIGS. 13 and 14. Accordingly, the substantially same portions are identified with the same reference signs, and description of those will be omitted.

In the present embodiment, the axial thickness t2 of the second web 16 becomes thinner gradually from the outer peripheral surface 12B of the intermediate cylindrical portion 12 to the inner circumferential surface 4A of the teeth-formed cylindrical portion 4, and the circumferential thickness T2 of each second radial rib 20 becomes thinner gradually from the outer peripheral surface 12B of the intermediate cylindrical portion 12 to the inner circumferential surface 4A of the teeth-formed cylindrical portion 4. Accordingly, the effect which is substantially the same as that of the previous embodiment described with reference to FIGS. 1 and 2 can be achieved, and the strength of the gear is further improved.

In the embodiment shown in FIGS. 17 and 18, there is another embodiment in which the configuration of the second web 16 is substantially the same as any of the configuration of the web 6 shown in FIGS. 3 through 5. When the second web 16 adopts the configuration of the web 6 shown in FIG. 4, it will have the same configuration as the second web 16 shown in FIG. 15. Further, when the second web 16 adopts the configuration of the web 6 shown in FIG. 5, it will have the same configuration as the second web 16 shown in FIG. 16.

Further, in the embodiment shown in FIGS. 17 and 18, there is another embodiment in which a configuration of the second radial rib 20 is substantially the same as that of any one of the configurations of the radial rib 10 shown in FIGS. 10 through 12.

Figure 19:
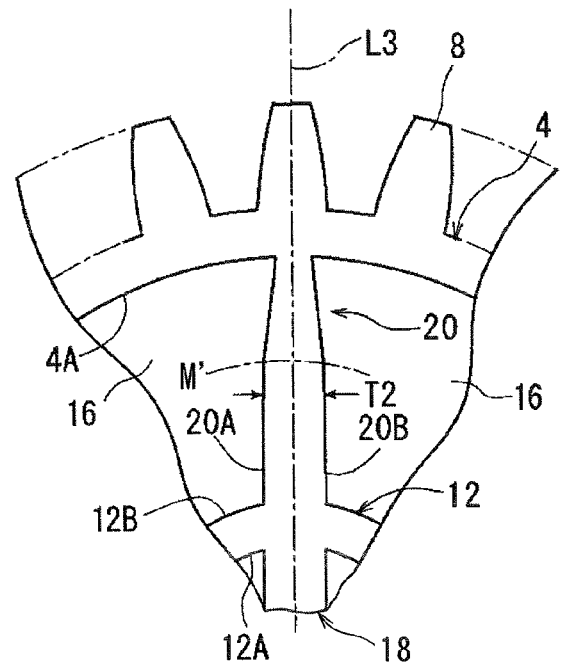
FIG. 19 is a front view schematically showing relevant parts of yet another embodiment of a gear which is configured in accordance with the present invention.
Figure 20:
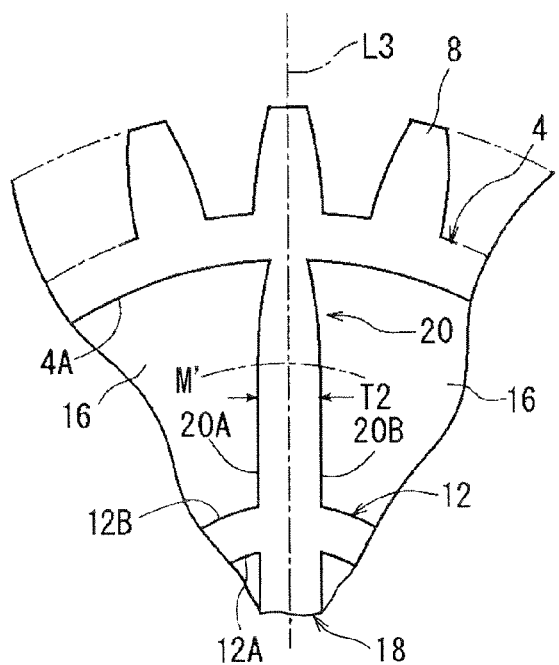
FIG. 20 is a front view schematically showing relevant parts of yet another embodiment of a gear which is configured in accordance with the present invention.

In other words, there is an embodiment in which the circumferentially opposite surfaces 20A and 20B of each second radial rib 20 are symmetrical about the center line L3 and curve from the outer peripheral surface 12B of the intermediate cylindrical portion 12 to the inner circumferential surface 4A of the teeth-formed cylindrical portion 4 so as to come close to the center line L3 gradually, similarly to the radial rib 10 shown in FIG. 10. Further, as shown in FIGS. 19 and 20, there is an embodiment in which the circumferential thickness T2 of each second radial rib 20 is constant from the outer peripheral surface 12B of the intermediate cylindrical portion 12 to a radially intermediate position M' between the outer peripheral surface 12B of the intermediate cylindrical portion 12 and the inner circumferential surface 4A of the teeth-formed cylindrical portion 4 and becomes thinner gradually from the intermediate position M' to the inner circumferential surface 4A of the teeth-formed cylindrical portion 4. In the embodiment shown in FIG. 19, the circumferentially opposite surfaces 20A and 20B of each second radial rib 20 are symmetrical about the center line L3 and are so formed as to have flat surfaces sloping in straight lines from the intermediate position M' to the inner circumferential surface 4A of the teeth-formed cylindrical portion 4, similarly to the radial rib 10 shown in FIG. 11. On the other hand, in the embodiment shown in FIG. 20, the circumferentially opposite surfaces 20A and 20B of each second radial rib 20 are symmetrical about the center line L3 and curve from the intermediate position M' to the inner circumferential surface 4A of the teeth-formed cylindrical portion 4 so as to come close to the center line L3 gradually, similarly to the radial rib 10 shown in FIG. 12.

Also in these embodiments, the effect which is substantially the same as that of the previous embodiment described with reference to FIGS. 1 and 2 can be achieved, and existence of the intermediate cylindrical portion 12 improves the strength of the gear.

Further, in the embodiments shown in FIGS. 17 through 20, circumferential positions of the second radial ribs 20 are the same as those of the first radial ribs 18. In other words, the alignments in the circumferential direction of the second radial rib 20 are the same as those of the first radial rib 18, or on an outward extension in the radial direction of the first radial rib 18. In the embodiments shown in FIGS. 17 through 20, there is another embodiment in which the second radial ribs 20 are provided at positions not aligning with the first radial ribs 18 in the circumferential direction.

In the embodiments shown in FIGS. 13 through 20, a maximum axial thickness t2 of the second web 16 is equal to the axial thickness t1 of the first web 14. Further, in the embodiments shown in FIG. 17 through 20, the maximum circumferential thickness T2 of each second radial rib 20 is equal to the circumferential thickness T1 of each first radial rib 18. These configurations contribute to improvement of the effect of the previous embodiment described with reference to FIGS. 1 and 2.

Next, a printer as an example of an image forming apparatus to which any of the above-described gears is provided will be described with reference to FIGS. 21 and 22.

Figure 21:
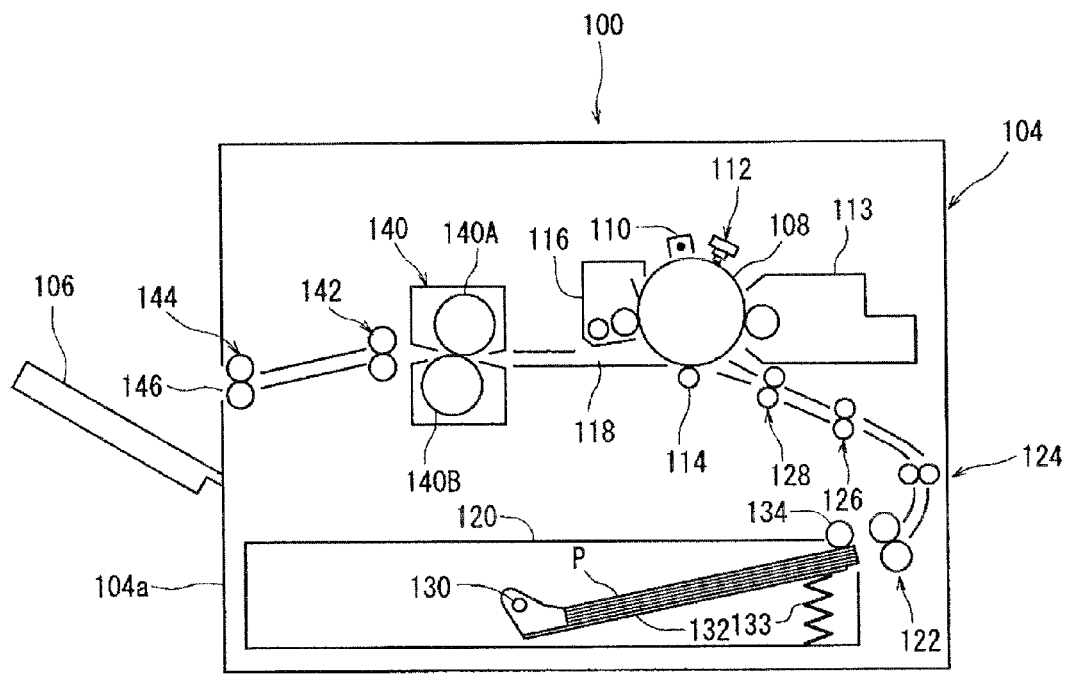
FIG. 21 schematically shows a configuration of an embodiment of a printer provided with a gear which is configured in accordance with the present invention.
Figure 22:
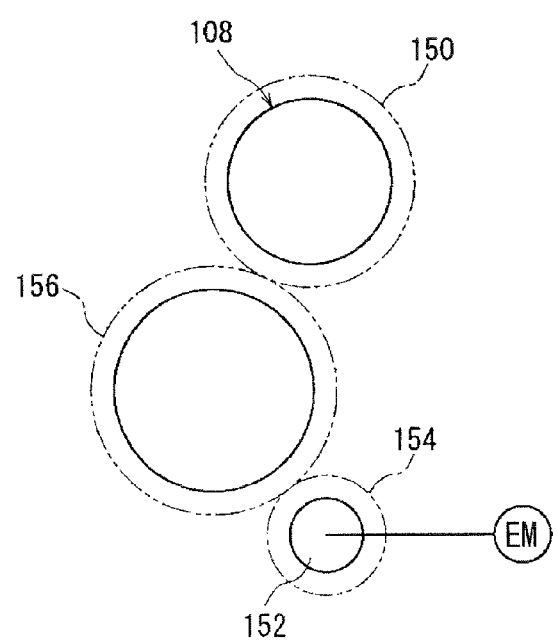
FIG. 22 schematically shows a configuration of an embodiment of a drive power source, a power transmission structure, and a rotating member provided in the printer shown in FIG. 21.

Firstly, with reference to FIG. 21, a printer 100 as an example of the image forming apparatus includes a printer main body 104 as an image forming apparatus main body having a substantially rectangular solid shape. In one side surface 104a of the printer main body 104 positioned on the left side surface in FIG. 21, a sheet-discharging tray 106 is mounted foldably. In a substantially central area of the printer main body 104, there is provided a photoconductive drum 108 as an image bearing member. The photoconductive drum 108 is rotated in a clockwise direction in FIG. 21. In a periphery of the photoconductive drum 108, there are provided a main charging device 110, an LED print head 112, a developing device 113, a transferring roller 114, a cleaning device 116, and an unillustrated charge removing device.

At a substantially central portion in a vertical direction in the printer main body 104, there is provided a conveying passage 118 for conveying a sheet P. Further, in a lower end portion in the printer main body 104, there is mounted a sheet feeding cassette 120. The conveying passage 118 passes through the photoconductive drum 108 and the transferring roller 114 and extends horizontally in a tangential direction of the photoconductive drum 108 and the transferring roller 114. An upstream end area of the conveying passage 118 is connected to the sheet feeding cassette 120 reversely in a lower side.

On an upstream side of the photoconductive drum 108 in the conveying passage 118, there are provided a pair of separating rollers 122, a pair of conveying rollers 124 and 126, and a pair of registration rollers 128. The pair of separating rollers 122, the pair of conveying rollers 124 and 126, and a pair of registration rollers 128 are provided sequentially from an upstream to a downstream along the conveying passage 118.

In the sheet-feeding cassette 120, there are provided a bottom plate 132 as a sheet holding plate whose one end is supported rotatably about an axis 130, a compressed coil spring 133 for pushing up the other end of the bottom plate 132, and the like. An upper surface of a leading end portion of a sheet P stacked on the bottom plate 132 and accommodated in a sheet-feeding cassette 120 comes in pressed contact with a pick up roller 134 provided in the printer main body 104.

On a downstream side of the photoconductive drum 108 in the conveying passage 118, there is provided a fixing device 140. The fixing device 140 is provided with a fixing roller 140A as a heat roller and a pressing roller 140B which comes in pressed contact with the fixing roller 140A from a lower side. On a downstream side of the fixing device 140 in the conveying passage 118, there are provided a pair of conveying rollers 142 and a pair of sheet-discharging rollers 144 sequentially from an upstream to a downstream. In one side surface 104a of the printer main body 104 on a downstream side of the pair of sheet-discharging rollers 144, there is formed a sheet-discharging slot 146 for discharging a sheet P.

When a print signal is transmitted from an unillustrated personal computer to the printer 100, a surface of the photoconductive drum 108 uniformly charged by the main charging device 110 is exposed by the LED print head 112 so that an electrostatic latent image is formed thereon. The electrostatic latent image is developed by the developing device 112 to form a toner image. The toner image is transferred to one surface of the sheet P conveyed from the sheet-feeding cassette 120 at a predetermined timing by the transferring roller 114. The sheet P onto which the toner image is transferred is conveyed to the fixing device 140 along the conveying passage 118. When the sheet P passes through the fixing device 140, the toner image is heated to be fixed on the sheet P. The sheet P on which the toner image is fixed is discharged through the sheet-discharging slot 146 to the sheet-discharging tray 106 by the pair of conveying rollers 142 and the pair of sheet-discharging rollers 144.

The printer 100 is provided with a drive power source and a rotating member which is connected to the drive power source through a power transmission structure. The power transmission structure has a plurality of gears, and at least one of the plurality of gears has any one of the configuration of the gear described above. Specifically describing with reference to FIG. 22, a driven gear 150 is provided integrally rotatably on one end of the photoconductive drum 108 as a rotating member. On a driving shaft 152 of the electric motor EM as a drive power source, the drive gear 154 is provided integrally rotatably. The drive gear 154 of the electric motor EM and the driven gear 150 of the photoconductive drum 108 are connected through an intermediate gear 156. The driven gear 150, the intermediate gear 156, and the drive gear 154 constitute the power transmission structure. According to the configuration described above, the photoconductive drum 108 is rotationally driven by the electric motor EM.

In the present embodiment, any of the above-described gears is applied to the driven gear 150 of the photoconductive drum 108. As a result, a required strength of the driven gear 150 is secured. Accordingly, occurrence of irregularity in rotation due to vibration of meshing in gears is to be prevented, so that image quality is not impaired. Any of the gears described above may be applied to the intermediate gear 156 or the drive gear 154. Further, any of the gears described above may be applied to two or all of the gears 150, 156, and 154.

Outline of the Present Embodiment

A summary of the present embodiment will be described herebelow.

A gear in accordance with the present embodiment is made of resin and includes: a support cylindrical portion; a teeth-formed cylindrical portion arranged coaxially on a radially outer side of the support cylindrical portion and formed with a plurality of teeth in its outer periphery; and a web connecting an outer peripheral surface of the support cylindrical portion and an inner circumferential surface of the teeth-formed cylindrical portion. An axial thickness of at least a part of the web becomes thinner gradually from the outer peripheral surface of the support cylindrical portion to the inner circumferential surface of the teeth-formed cylindrical portion.

In the gear, it is preferable that the axial thickness of the web becomes thinner gradually from the outer peripheral surface of the support cylindrical portion to the inner circumferential surface of the teeth-formed cylindrical portion.

In the gear, it is preferable that the axial thickness of the web is constant from the outer peripheral surface of the support cylindrical portion to a radially intermediate position between the outer peripheral surface of the support cylindrical portion and the inner circumferential surface of the teeth-formed cylindrical portion, and becomes thinner gradually from the intermediate position to the inner circumferential surface of the teeth-formed cylindrical portion.

In the gear, it is preferable that a plurality of radial ribs which connect the outer peripheral surface of the support cylindrical portion and the inner circumferential surface of the teeth-formed cylindrical portion are provided and the plurality of radial ribs are so provided as to be spaced apart from one another in a circumferential direction, and a circumferential thickness of each radial rib becomes thinner gradually from the outer peripheral surface of the support cylindrical portion to the inner circumferential surface of the teeth-formed cylindrical portion.

In the gear, it is preferable that a plurality of radial ribs which connect the outer peripheral surface of the support cylindrical portion and the inner circumferential surface of the teeth-formed cylindrical portion are provided and the plurality of radial ribs are so provided as to be spaced apart from one another in a circumferential direction, and a circumferential thickness of each radial rib is constant from the outer peripheral surface of the support cylindrical portion to a radially intermediate position between the outer peripheral surface of the support cylindrical portion and the inner circumferential surface of the teeth-formed cylindrical portion, and becomes thinner gradually from the intermediate position to the inner circumferential surface of the teeth-formed cylindrical portion.

In the gear, it is preferable that an intermediate cylindrical portion arranged between the support cylindrical portion and the teeth-formed cylindrical portion coaxially with the support cylindrical portion is provided and the web includes: a first web which connects the outer peripheral surface of the support cylindrical portion and an inner circumferential surface of the intermediate cylindrical portion; and a second web which connects an outer peripheral surface of the intermediate cylindrical portion and the inner circumferential surface of the teeth-formed cylindrical portion, and an axial thickness of the second web becomes thinner gradually from the outer peripheral surface of the intermediate cylindrical portion to the inner circumferential surface of the teeth-formed cylindrical portion.

In this case, it is preferable that the gear includes: a plurality of first radial ribs which connect the outer peripheral surface of the support cylindrical portion and the inner circumferential surface of the intermediate cylindrical portion; and a plurality of second radial ribs which connect the outer peripheral surface of the intermediate cylindrical portion and the inner circumferential surface of the teeth-formed cylindrical portion. The plurality of first radial ribs and the plurality of second radial ribs are so provided as to be spaced apart in a circumferential direction, and a circumferential thickness of each second radial rib becomes thinner gradually from the outer peripheral surface of the intermediate cylindrical portion to the inner circumferential surface of the teeth-formed cylindrical portion.

Further, in this case, it is preferable that a maximum circumferential thickness of each second radial rib is equal to a thickness in the circumferential direction of each first radial rib.

In the configuration having the intermediate cylindrical portion, it is preferable that the gear includes: a plurality of first radial ribs which connect the outer peripheral surface of the support cylindrical portion and the inner circumferential surface of the intermediate cylindrical portion; and a plurality of second radial ribs which connect the outer peripheral surface of the intermediate cylindrical portion and the inner circumferential surface of the teeth-formed cylindrical portion. The plurality of first radial ribs and the plurality of second radial ribs are so provided as to be spaced apart in a circumferential direction, and a circumferential thickness of each second radial rib is constant from the outer peripheral surface of the intermediate cylindrical portion to a radially intermediate position between the outer peripheral surface of the intermediate cylindrical portion and the inner circumferential surface of the teeth-formed cylindrical portion, and becomes thinner gradually from the intermediate position to the inner circumferential surface of the teeth-formed cylindrical portion.

In this case, it is preferable that a maximum circumferential thickness of each second radial rib is equal to a circumferential thickness of each first radial rib.

In the configuration in which the web includes the first web and the second web, it is preferable that a maximum axial thickness of the second web is equal to an axial thickness of the first web.

In the gear, it is preferable that the gear includes an intermediate cylindrical portion arranged between the support cylindrical portion and the teeth-formed cylindrical portion coaxially with the support cylindrical portion and the web includes: a first web which connects the outer peripheral surface of the support cylindrical portion and the inner circumferential surface of the intermediate cylindrical portion; and a second web which connects an outer peripheral surface of the intermediate cylindrical portion and the inner circumferential surface of the teeth-formed cylindrical portion, and an axial thickness of the second web is constant from the outer peripheral surface of the intermediate cylindrical portion to a radially intermediate position between the outer peripheral surface of the intermediate cylindrical portion and the inner circumferential surface of the teeth-formed cylindrical portion, and becomes thinner gradually from the intermediate position to the inner circumferential surface of the teeth-formed cylindrical portion.

In this case, it is preferable that the gear includes: a plurality of first radial ribs which connect the outer peripheral surface of the support cylindrical portion and the inner circumferential surface of the intermediate cylindrical portion; and a plurality of second radial ribs which connect the outer peripheral surface of the intermediate cylindrical portion and the inner circumferential surface of the teeth-formed cylindrical portion, and the plurality of first radial ribs and the plurality of second radial ribs are so provided as to be spaced apart in a circumferential direction, and a circumferential thickness of each second radial rib becomes thinner gradually from the outer peripheral surface of the intermediate cylindrical portion to the inner circumferential surface of the teeth-formed cylindrical portion.

Further, in this case, it is preferable that a maximum circumferential thickness of each second radial rib is equal to a circumferential thickness of each first radial rib.

In the configuration in which the axial thickness of the second web is constant from the outer peripheral surface of the intermediate cylindrical portion to an intermediate position in the radial direction between the outer peripheral surface of the intermediate cylindrical portion and the inner circumferential surface of the teeth-formed cylindrical portion, and becomes thinner gradually as it goes from the intermediate position to the inner circumferential surface of the teeth-formed cylindrical portion, it is preferable that the gear includes: a plurality of first radial ribs which connect the outer peripheral surface of the support cylindrical portion and the inner circumferential surface of the intermediate cylindrical portion; and a plurality of second radial ribs which connect the outer peripheral surface of the intermediate cylindrical portion and the inner circumferential surface of the teeth-formed cylindrical portion, and the plurality of first radial ribs and the plurality of second radial ribs are so provided as to be spaced apart in a circumferential direction, and a circumferential thickness of each second radial rib is constant from the outer peripheral surface of the intermediate cylindrical portion to a radially intermediate position between the outer peripheral surface of the intermediate cylindrical portion and the inner circumferential surface of the teeth-formed cylindrical portion, and becomes thinner gradually from the intermediate position to the inner circumferential surface of the teeth-formed cylindrical portion.

In this case, it is preferable that a maximum thickness in the circumferential direction of each second radial rib is equal to a thickness in the circumferential direction of each first radial rib.

In the configuration in which the axial thickness of the second web is constant from the outer peripheral surface of the intermediate cylindrical portion to an intermediate position in the radial direction between the outer peripheral surface of the intermediate cylindrical portion and the inner circumferential surface of the teeth-formed cylindrical portion, and becomes thinner gradually as it goes from the intermediate position to the inner circumferential surface of the teeth-formed cylindrical portion, it is preferable that a maximum axial thickness of the second web is equal to an axial thickness of the first web.

Further, it is preferable that the gear is formed by injection molding from a resin material.

Further, an image forming apparatus in accordance with the present embodiment includes: a drive power source; and a rotating member connected to the drive power source via a power transmission structure, and the power transmission structure includes a plurality of gears, and at least one of the plurality of gears is configured by the above-described gear.

This application is based on Japanese Patent application serial No. 2007-126886 filed in Japan Patent Office on May 11, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A gear made of resin, comprising:
a support cylindrical portion;
a teeth-formed cylindrical portion arranged coaxially with the support cylindrical portion on a radially outer side of the support cylindrical portion and formed with a plurality of teeth in its outer periphery; and
a web connecting an outer peripheral surface of the support cylindrical portion and an inner circumferential surface of the teeth-formed cylindrical portion, wherein
an axial thickness of the web becomes thinner gradually from the outer peripheral surface of the support cylindrical portion until a position where the web is connected to the inner circumferential surface of the teeth-formed cylindrical portion.

2. The gear according to claim 1, further comprising:
a plurality of radial ribs which connect the outer peripheral surface of the support cylindrical portion and the inner circumferential surface of the teeth-formed cylindrical portion, wherein
the plurality of radial ribs are so provided as to be spaced apart from one another in a circumferential direction, and a circumferential thickness of each radial rib becomes thinner gradually from the outer peripheral surface of the support cylindrical portion to the inner circumferential surface of the teeth-formed cylindrical portion.

3. An image forming apparatus, comprising:
a drive power source; and
a rotating member connected to the drive power source via a power transmission structure, wherein
the power transmission structure includes a plurality of gears, and at least one of the plurality of gears is configured by a gear according to claim 1.

4. A gear made of resin, comprising:
a support cylindrical portion;
a teeth-formed cylindrical portion arranged coaxially with the support cylindrical portion on a radially outer side of the support cylindrical portion and formed with a plurality of teeth in its outer periphery; and
a web connecting an outer peripheral surface of the support cylindrical portion and an inner circumferential surface of the teeth-formed cylindrical portion, wherein
the axial thickness of the web is constant from the outer peripheral surface of the support cylindrical portion until a radially intermediate position between the outer peripheral surface of the support cylindrical portion and the inner circumferential surface of the teeth-formed cylindrical portion, and becomes thinner gradually from the intermediate position until a position where the web is connected to the inner circumferential surface of the teeth-formed cylindrical portion.

5. The gear according to claim 4, further comprising:
a plurality of radial ribs which connect the outer peripheral surface of the support cylindrical portion and the inner circumferential surface of the teeth-formed cylindrical portion, wherein
the plurality of radial ribs are so provided as to be spaced apart from one another in a circumferential direction, and a circumferential thickness of each radial rib becomes thinner gradually from the outer peripheral surface of the support cylindrical portion to the inner circumferential surface of the teeth-formed cylindrical portion.

6. An image forming apparatus, comprising:
a drive power source; and
a rotating member connected to the drive power source via a power transmission structure, wherein
the power transmission structure includes a plurality of gears, and at least one of the plurality of gears is configured by a gear according to claim 4.

7. A gear made of resin, comprising:
a support cylindrical portion;
a teeth-formed cylindrical portion arranged coaxially with the support cylindrical portion on a radially outer side of the support cylindrical portion and formed with a plurality of teeth in its outer periphery;
a web connecting an outer peripheral surface of the support cylindrical portion and an inner circumferential surface of the teeth-formed cylindrical portion; and
a plurality of radial ribs which connect the outer peripheral surface of the support cylindrical portion and the inner circumferential surface of the teeth-formed cylindrical portion, wherein
an axial thickness of at least a part of the web becomes thinner gradually from the outer peripheral surface of the support cylindrical portion to the inner circumferential surface of the teeth-formed cylindrical portion, and
the plurality of radial ribs are so provided as to be spaced apart from one another in a circumferential direction, and a circumferential thickness of each radial rib is constant from the outer peripheral surface of the support cylindrical portion until a radially intermediate position between the outer peripheral surface of the support cylindrical portion and the inner circumferential surface of the teeth-formed cylindrical portion, and becomes thinner gradually from the intermediate position until a position where the radial rib is connected to the inner circumferential surface of the teeth-formed cylindrical portion.

8. An image forming apparatus, comprising:
a drive power source; and
a rotating member connected to the drive power source via a power transmission structure, wherein
the power transmission structure includes a plurality of gears, and at least one of the plurality of gears is configured by a gear according to claim 7.

9. A gear made of resin, comprising:
a support cylindrical portion;
a teeth-formed cylindrical portion arranged coaxially with the support cylindrical portion on a radially outer side of the support cylindrical portion and formed with a plurality of teeth in its outer periphery;
a web connecting an outer peripheral surface of the support cylindrical portion and an inner circumferential surface of the teeth-formed cylindrical portion; and
an intermediate cylindrical portion arranged between the support cylindrical portion and the teeth-formed cylindrical portion coaxially with the support cylindrical portion, wherein
the web includes:
a first web which connects the outer peripheral surface of the support cylindrical portion and an inner circumferential surface of the intermediate cylindrical portion; and
a second web which connects an outer peripheral surface of the intermediate cylindrical portion and the inner circumferential surface of the teeth-formed cylindrical portion, and
an axial thickness of the second web becomes thinner gradually from the outer peripheral surface of the intermediate cylindrical portion to an inner circumferential surface of the teeth-formed cylindrical portion.

10. The gear according to claim 9, further comprising:
a plurality of first radial ribs which connect the outer peripheral surface of the support cylindrical portion and the inner circumferential surface of the intermediate cylindrical portion; and
a plurality of second radial ribs which connect the outer peripheral surface of the intermediate cylindrical portion and the inner circumferential surface of the teeth-formed cylindrical portion, wherein
the plurality of first radial ribs and the plurality of second radial ribs are so provided as to be spaced apart in a circumferential direction, and
a circumferential thickness of each second radial rib becomes thinner gradually from the outer peripheral surface of the intermediate cylindrical portion to the inner circumferential surface of the teeth-formed cylindrical portion.

11. The gear according to claim 10, wherein a maximum circumferential thickness of each second radial rib is equal to a circumferential thickness of each first radial rib.

12. The gear according to claim 9, further comprising:
a plurality of first radial ribs which connect the outer peripheral surface of the support cylindrical portion and the inner circumferential surface of the intermediate cylindrical portion; and
a plurality of second radial ribs which connect the outer peripheral surface of the intermediate cylindrical portion and the inner circumferential surface of the teeth-formed cylindrical portion, wherein
the plurality of first radial ribs and the plurality of second radial ribs are so provided as to be spaced apart in a circumferential direction, and
a circumferential thickness of each second radial rib is constant from the outer peripheral surface of the support cylindrical portion to a radially intermediate position between the outer peripheral surface of the intermediate cylindrical portion and the inner circumferential surface of the teeth-formed cylindrical portion, and becomes thinner gradually from the intermediate position to the inner circumferential surface of the teeth-formed cylindrical portion.

13. The gear according to claim 12, wherein a maximum circumferential thickness of each second radial rib is equal to a circumferential thickness of each first radial rib.

14. The gear according to claim 9, wherein a maximum axial thickness of the second web is equal to an axial thickness of the first web.

15. The gear according to claim 9, further comprising:
a plurality of radial ribs which connect the outer peripheral surface of the support cylindrical portion and the inner circumferential surface of the teeth-formed cylindrical portion, wherein
the plurality of radial ribs are so provided as to be spaced apart from one another in a circumferential direction, and a circumferential thickness of each radial rib becomes thinner gradually from the outer peripheral surface of the support cylindrical portion to the inner circumferential surface of the teeth-formed cylindrical portion.

16. An image forming apparatus, comprising:
a drive power source; and
a rotating member connected to the drive power source via a power transmission structure, wherein the power transmission structure includes a plurality of gears, and at least one of the plurality of gears is configured by a gear according to claim 9.

17. A gear made of resin, comprising:
a support cylindrical portion;
a teeth-formed cylindrical portion arranged coaxially with the support cylindrical portion on a radially outer side of the support cylindrical portion and formed with a plurality of teeth in its outer periphery;
a web connecting an outer peripheral surface of the support cylindrical portion and an inner circumferential surface of the teeth-formed cylindrical portion; and
an intermediate cylindrical portion arranged between the support cylindrical portion and the teeth-formed cylindrical portion coaxially with the support cylindrical portion, wherein
the web includes:
a first web which connects the outer peripheral surface of the support cylindrical portion and the inner circumferential surface of the intermediate cylindrical portion; and
a second web which connects an outer peripheral surface of the intermediate cylindrical portion and the inner circumferential surface of the teeth-formed cylindrical portion, wherein
an axial thickness of the second web is constant from the outer peripheral surface of the intermediate cylindrical portion to a radially intermediate position between the outer peripheral surface of the intermediate cylindrical portion and the inner circumferential surface of the teeth-formed cylindrical portion, and becomes thinner gradually from the intermediate position to the inner circumferential surface of the teeth-formed cylindrical portion.

18. The gear according to claim 17, further comprising:
a plurality of first radial ribs which connect the outer peripheral surface of the support cylindrical portion and the inner circumferential surface of the intermediate cylindrical portion; and
a plurality of second radial ribs which connect the outer peripheral surface of the intermediate cylindrical portion and the inner circumferential surface of the teeth-formed cylindrical portion, wherein
the plurality of first radial ribs and the plurality of second radial ribs are so provided as to be spaced apart in a circumferential direction, and
a circumferential thickness of each second radial rib becomes thinner gradually from the outer peripheral surface of the intermediate cylindrical portion to the inner circumferential surface of the teeth-formed cylindrical portion.

19. The gear according to claim 18, wherein a maximum circumferential thickness of each second radial rib is equal to a circumferential thickness of each first radial rib.

20. The gear according to claim 17, further comprising:
a plurality of first radial ribs which connect the outer peripheral surface of the support cylindrical portion and the inner circumferential surface of the intermediate cylindrical portion; and
a plurality of second radial ribs which connect the outer peripheral surface of the intermediate cylindrical portion and the inner circumferential surface of the teeth-formed cylindrical portion, wherein
the plurality of first radial ribs and the plurality of second radial ribs are so provided as to be spaced apart in a circumferential direction, and
a circumferential thickness of each second radial rib is constant from the outer peripheral surface of the intermediate cylindrical portion to a radially intermediate position between the outer peripheral surface of the intermediate cylindrical portion and the inner circumferential surface of the teeth-formed cylindrical portion, and becomes thinner gradually from the intermediate position to the inner circumferential surface of the teeth-formed cylindrical portion.

21. The gear according to claim 20, wherein a maximum circumferential thickness of each second radial rib is equal to a circumferential thickness of each first radial rib.

22. The gear according to claim 17, a maximum axial thickness of the second web is equal to an axial thickness of the first web.

23. The gear according to claim 17, further comprising:
a plurality of radial ribs which connect the outer peripheral surface of the support cylindrical portion and the inner circumferential surface of the teeth-formed cylindrical portion, wherein
the plurality of radial ribs are so provided as to be spaced apart from one another in a circumferential direction, and a circumferential thickness of each radial rib becomes thinner gradually from the outer peripheral surface of the support cylindrical portion to the inner circumferential surface of the teeth-formed cylindrical portion.

24. An image forming apparatus, comprising:
a drive power source; and
a rotating member connected to the drive power source via a power transmission structure, wherein
the power transmission structure includes a plurality of gears, and at least one of the plurality of gears is configured by a gear according to claim 17.

25. A gear made of resin, comprising:
a support cylindrical portion;
a teeth-formed cylindrical portion arranged coaxially with the support cylindrical portion on a radially outer side of the support cylindrical portion and formed with a plurality of teeth in its outer periphery; and
a web connecting an outer peripheral surface of the support cylindrical portion and an inner circumferential surface of the teeth-formed cylindrical portion, wherein
an axial thickness of at least a part of the web becomes thinner gradually from the outer peripheral surface of the support cylindrical portion to the inner circumferential surface of the teeth-formed cylindrical portion, and the gear is formed by injection molding from a resin material.

26. The gear according to claim 25, further comprising:
a plurality of radial ribs which connect the outer peripheral surface of the support cylindrical portion and the inner circumferential surface of the teeth-formed cylindrical portion, wherein
the plurality of radial ribs are so provided as to be spaced apart from one another in a circumferential direction, and a circumferential thickness of each radial rib becomes thinner gradually from the outer peripheral surface of the support cylindrical portion to the inner circumferential surface of the teeth-formed cylindrical portion.

27. An image forming apparatus, comprising:
a drive power source; and
a rotating member connected to the drive power source via a power transmission structure, wherein
the power transmission structure includes a plurality of gears, and at least one of the plurality of gears is configured by a gear according to claim 25.

* * * * *